(12) United States Patent
Blake et al.

(10) Patent No.: US 6,227,450 B1
(45) Date of Patent: *May 8, 2001

(54) ELECTRONICALLY-CONTROLLED MECHANICALLY-DAMPED OFF-RESONANT LIGHT BEAM SCANNING MECHANISM AND CODE SYMBOL READERS EMPLOYING THE SAME

(75) Inventors: Robert E. Blake, Woodbury Heights; Charles A. Naylor, Sewell, both of NJ (US); Stephen J. Colavito, Brookhaven, PA (US); Thomas Amundsen, Turnersville, NJ (US); Thomas Carullo, Marlton, NJ (US); C. Harry Knowles, Moorestown, NJ (US)

(73) Assignee: Metrologic Instruments, Inc., Blackwood, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,691

(22) Filed: Sep. 16, 1997

Related U.S. Application Data

(63) Continuation-in-part of application No. 08/916,694, filed on Aug. 22, 1997, now Pat. No. 5,905,248, and a continuation-in-part of application No. 08/869,164, filed on Jun. 4, 1997, and a continuation-in-part of application No. 08/846,219, filed on Apr. 25, 1997, and a continuation-in-part of application No. 08/838,501, filed on Apr. 7, 1997, now Pat. No. 5,869,819, which is a continuation-in-part of application No. 08/820,540, filed on Mar. 19, 1997, which is a continuation-in-part of application No. 08/753,367, filed on Nov. 25, 1996, now abandoned, which is a continuation-in-part of application No. 08/651,951, filed on May 21, 1996, now Pat. No. 5,874,721, and a continuation-in-part of application No. 08/645,331, filed on May 13, 1996, now Pat. No. 5,844,227, and a continuation-in-part of application No. 08/615,054, filed on Mar. 12, 1996, and a continuation-in-part of application No. 08/584,135, filed on Jan. 11, 1996, now Pat. No. 5,616,908, and a continuation-in-part of application No. 08/573,949, filed on Dec. 18, 1995, now abandoned, and a continuation-in-part of application No. 08/561,479, filed on Nov. 20, 1995, now Pat. No. 5,661,292, which is a continuation-in-part of application No. 08/489,305, filed on Jun. 9, 1995, now abandoned, and a continuation-in-part of application No. 08/476,069, filed on Jun. 7, 1995, now Pat. No. 5,591,953, and a continuation-in-part of application No. 08/365,193, filed on Dec. 28, 1994, and a continuation-in-part of application No. 08/293,493, filed on Aug. 19, 1994, now Pat. No. 5,525,789, and a continuation-in-part of application No. 08/292,237, filed on Aug. 17, 1994, now Pat. No. 5,808,285, and a continuation-in-part of application No. 08/278,109, filed on Nov. 24, 1993, now Pat. No. 5,484,992, which is a continuation of application No. 07/821,917, filed on Jan. 16, 1992, now abandoned, which is a continuation-in-part of application No. 07/583,421, filed on Sep. 17, 1990, now Pat. No. 5,260,553, and a continuation-in-part of application No. 07/580,740, filed on Sep. 11, 1990, now abandoned.

(51) Int. Cl.[7] ..................................................... G06K 7/10
(52) U.S. Cl. ............................... 235/462.36; 235/472.01
(58) Field of Search ........................... 235/462.36, 472.01

(56) References Cited

U.S. PATENT DOCUMENTS 3,532,408    10/1970   Dostal .

(List continued on next page.)

OTHER PUBLICATIONS

Search Report; 108–034PCT000, 1998.

*Primary Examiner*—Harold I. Pitts
(74) *Attorney, Agent, or Firm*—Thomas J. Perkowski, Esq., P.C.

(57) ABSTRACT

Disclosed is laser beam scanning apparatus in the form of an electronically-controlled mechanically-damped off-resonant laser beam scanning mechanism. The scanning mechanism comprises an etched scanning element having a small flexible gap region of closely-controlled dimensions disposed between an anchored base portion and a laser beam deflecting portion The light beam deflecting portion supports a permanent magnet and a light beam deflecting element (e.g., mirror or hologram). A reversible magnetic force field producing device (e.g., an electromagnet) is placed in close proximity with the permanent magnet so that it may be forcibly driven into oscillation in response to electrical current flowing through the electromagnet. The resonant frequency of oscillation of the laser beam deflecting portion relative to the anchored base portion is determined by the closely controlled dimensions of the flexible gap region set during manufacture. The steady-state frequency of oscillation of the laser beam deflecting portion is determined by the frequency of polarity reversal of the electromagnet, which is electronically controlled by the polarity of electrical current supplied thereto.

34 Claims, 12 Drawing Sheets

U.S. PATENT DOCUMENTS

| | | |
|---|---|---|
| 3,671,766 | 6/1972 | Howe . |
| 3,919,527 * | 11/1975 | Bowen et al. .................. 235/462.36 |
| 4,044,283 | 8/1977 | Allison . |
| 4,063,287 | 12/1977 | van Rosmalen . |
| 4,387,297 * | 6/1983 | Swartz et al. ........................ 235/462 |
| 4,632,501 | 12/1986 | Glynn . |
| 4,717,241 | 1/1988 | Aagano . |
| 4,958,894 | 9/1990 | Knowles . |
| 5,168,149 | 12/1992 | Dvorkis et al. . |
| 5,224,088 | 6/1993 | Atiya . |
| 5,262,627 | 11/1993 | Shepard . |
| 5,280,165 | 1/1994 | Dvorkis et al. . |
| 5,329,103 * | 7/1994 | Rando .................................. 235/462 |
| 5,373,148 | 12/1994 | Dvorkis et al. . |
| 5,412,198 * | 5/1995 | Dvorkis ........................... 235/462.36 |
| 5,543,610 | 8/1996 | Bard et al. . |
| 5,581,067 | 12/1996 | Grosfeld et al. . |
| 5,600,119 * | 2/1997 | Dvorkis et al. ..................... 235/462 |

* cited by examiner

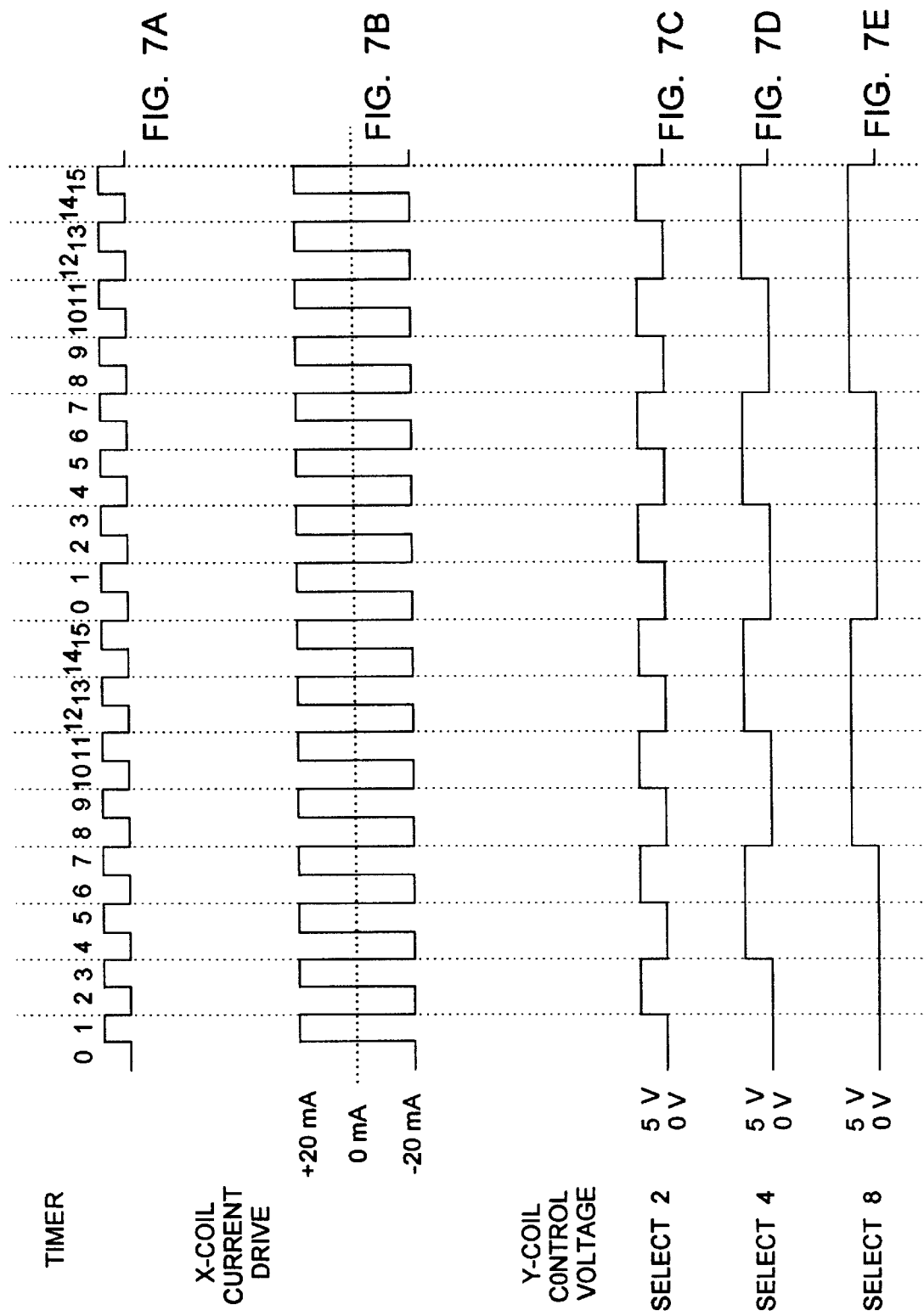

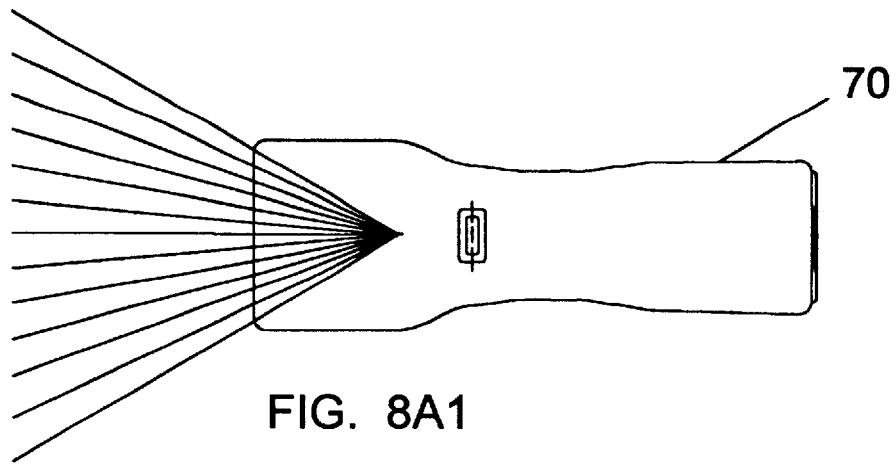
FIG. 8A1
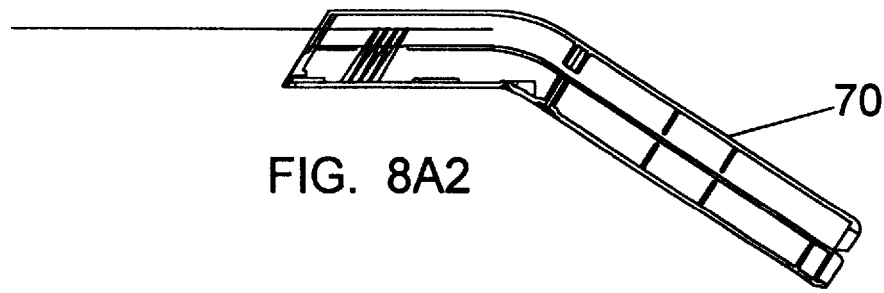
FIG. 8A2
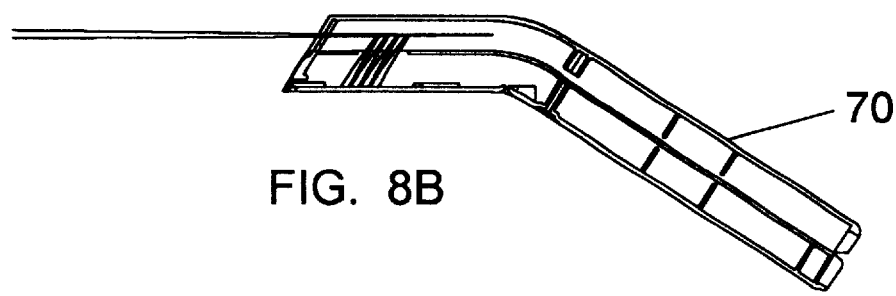
FIG. 8B
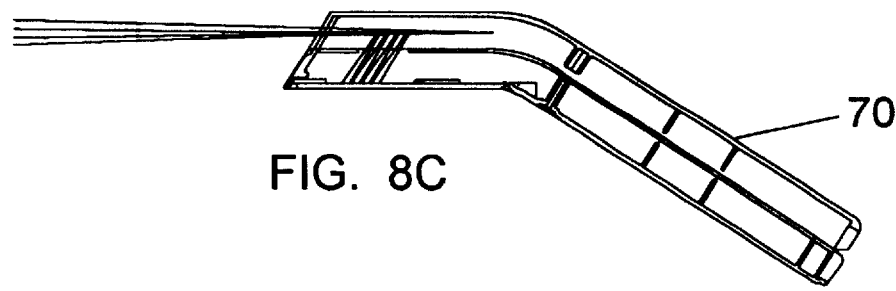
FIG. 8C
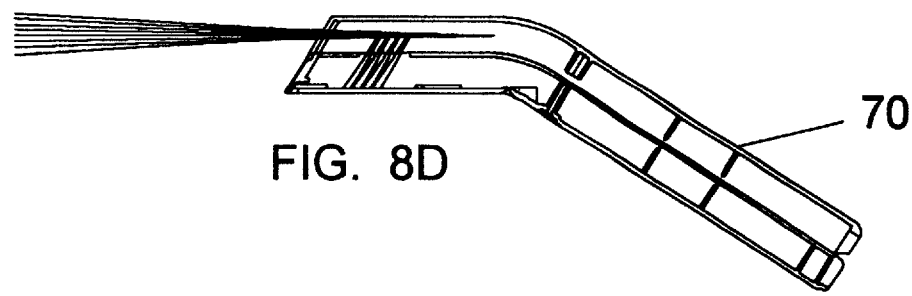
FIG. 8D

1D/2D

ELECTRONICALLY-CONTROLLED MECHANICALLY-DAMPED OFF-RESONANT LIGHT BEAM SCANNING MECHANISM AND CODE SYMBOL READERS EMPLOYING THE SAME

RELATED CASES

This Application is a Continuation-in-part of: application Ser. No. 08/916,694 entitled "SYSTEM AND METHOD FOR CARRYING OUT INFORMATION-RELATED TRANSACTIONS USING WEB DOCUMENTS EMBODYING TRANSACTION-ENABLING APPLETS AUTOMATICALLY LAUNCHED AND EXECUTED IN RESPONSE TO READING URL-ENCODED SYMBOLS POINTING THERETO" by inventors Garrett Russell, David M. Wilz, Sr., and C. Harry Knowles filed Aug. 22, 1997 now U.S. Pat. No. 5,905,248; copending application Ser. No. 08/869,164 filed Jun. 4, 1997; copending application Ser. No. 08/846,219 entitled "Programmed Bar Code Symbol Reader For Accessing Internet-based Information Resources By Scanning Java-Applet Encoded Bar Code Symbols", filed Apr. 25, 1997; application Ser. No. 08/838,501 entitled "Internet-Based System And Method For Track Objects Bearing URL-Encoded Bar Code Symbols" by Davy M. Wilz, Sr. and C. Harry Knowles, filed Apr. 7, 1997, now U.S. Pat. No. 5,869,819 which is a Continuation-in-Part of copending application Ser. No. 08/820,540 entitled "System And Method For Composing And Printing URL-encoded bar code symbol Lists And Menus For Use In Visiting Internet-Based Information Resources By Scanning The Same" by Harry Knowles, filed Mar. 19, 1997, which is a Continuation-in-part of application Ser. No. 08/753,367 filed Nov. 25, 1996 now abandoned; application Ser. No. 08/645,331 filed May 13, 1996, now U.S. Pat. No. 5,844,227; copending application Ser. No. 08/615,054 filed Mar. 12,, 1996; application Ser. No. 08/573,949 filed Dec. 18, 1995 now abandoned; application Ser. No. 08/292,237 filed Aug. 17, 1994, now U.S. Pat. No. 5,808,285; copending application Ser. No. 08/365,193 filed Dec. 28, 1994; application Ser. No. 08/293,493 filed Aug. 19, 1994, now U.S. Pat. No. 5,525,789; copending application Ser. No. 08/561,479 filed Nov. 20, 1995, now U.S. Pat. No. 5,661,292; application Ser. No. 08/278,109 filed Nov. 24, 1993, now U.S. Pat. No. 5,484,992; Ser. No. 08/476,069 filed Jun. 7, 1995 U.S. Pat. No. 5,591,953; application Ser. No. 08/584,135 filed Jan. 11, 1996, now U.S. Pat. No. 5,616,908 which is a continuation of application Ser. No. 08/651,951 filed May 21, 1996, now U.S. Pat. No. 5,874,721; which is a continuation of application Ser. No. 08/489,305 filed Jun. 9, 1995 now abandoned which is a continuation of application Ser. No. 07/821,917 filed Jan. 16, 1992, now abandoned, which is a continuation-in-part of application Ser. No. 07/583,421 filed Sep. 17, 1990, now U.S. Pat. No. 5,260,553, and application Ser. No. 07/580,740 filed Sep. 11, 1990, now abandoned. Each said patent application is assigned to and commonly owned by Metrologic Instruments, Inc. of Blackwood, N.J., and is incorporated herein by reference in its entirety.

BACKGROUND OF THE INVENTION

1. Field of Invention

The present invention relates to laser scanning systems and more particularly, to electronically-controlled damped off-resonant mechanisms for reliably scanning laser beams during bar code symbol reading operations and the like.

2. Brief Description of the Prior Art

Laser scanning bar code symbol scanners are widely used to read bar code symbols on products and packages for identification purposes. Many different techniques exist for scanning laser beams across objects.

One commonly used beam scanning technique involves driving a resonant element bearing a mirror into oscillatory motion within a plane, while a laser beam is directed incident the mirror surface. As the resonant element oscillates, so too does the mirror, causing the incident laser beam to be scanned across a scanning field of substantially planar extent, as well as a bar code symbol disposed therewithin. In general, laser light reflected from the scanned bar code symbol is collected and detected to produce an electrical signal representative of the scanned symbol. Ultimately, the electrical signal is processed in order to decode the scanned symbol and produce symbol character data representative of the decoded symbol.

In U.S. Pat. Nos. 5,168,149, 5,280,165, 5,374,148 and 5,581,067, several different scanning mechanisms are disclosed, in which strips made of Mylar™ or Kapton™ plastic material are used to realize resonant scanning elements. While such prior art scanning elements are durable, they are not without their shortcomings and drawbacks.

Such prior art laser scanning mechanisms are generally massive and large in comparison to the size of the scanning mirror supported thereby. Prior art laser scanning mechanisms are generally difficult to produce, expensive to manufacture, difficult to precisely tune, and typically require an anti-shock mechanism to protect the scanning element from damage when dropped. Consequently, there are numerous applications where such limitations prevent prior art scanning mechanisms from being used in a commercially feasible manner.

Addressing the shortcomings and drawbacks associated with the above-described scanning mechanism, Applicants hereof have attempted to construct a laser beam scanning mechanism, in which a thin strip of Kapton™ film, anchored at its base end and supporting a miniature mirror and a ferrite magnet on its free end, is driven in an off-resonant mode of operation in order to scan a laser beam incident the mirror. While laboring long and hard, Applicants have been unable to consistently manufacture in large volume and at low cost, a laser beam scanning mechanism based on such prior art design principles, without seriously sacrificing the operation and performance thereof.

Consequently, hitherto, Metrologic's ScanQuest® Laser Scanning Engine (Models 4110 and 4120), in which the above-described scanning mechanism is employed, could not be manufactured in high volume or at low cost.

Therefore, there is a great need in the art for an improved laser scanning mechanism which avoids the shortcomings and drawbacks of prior art laser beam scanning apparatus and methodologies.

OBJECTIVES AND SUMMARY OF THE INVENTION

Accordingly, it is a primary object of the present invention to provide an improved laser beam scanning apparatus that avoids the shortcomings and drawbacks of prior art technologies.

A further object of the present invention is to provide such a laser beam scanning apparatus in the form of an electronically-controlled mechanically-damped off-resonant laser beam scanning mechanism comprising an etched scanning element having a small flexible gap region of closely-controlled dimensions disposed between an anchored base portion and a laser beam deflecting portion.

Another object of the present invention is to provide such a laser beam scanning mechanism, in which the resonant frequency of oscillation of the laser beam deflecting portion relative to the anchored base portion is determined by the closely controlled dimensions of the flexible gap region set during manufacture.

A further object of the present invention is to provide such a laser beam scanning mechanism, in which the resonant frequency of oscillation of the scanning element is tuned by adjusting the thickness and width of the flexible gap region.

Another object of the present invention is to provide such a laser beam scanning mechanism, in which the physical dimensions of the flexible gap region are closely controlled by using chemical-etching techniques during manufacture.

Another object of the present invention is to provide such a laser beam scanning mechanism, in which the etched scanning element is manufactured by chemically etching a double-sided copper clad sheet consisting of a polyamide base material laminated between ultra-thin copper sheets.

Another object of the present invention is to provide such a laser beam scanning mechanism, in which a permanent magnet is mounted on the rear surface of the laser beam deflecting portion, and a laser beam deflecting element is mounted on the front surface of the laser beam deflecting portion.

Another object of the present invention is to provide such a laser beam scanning mechanism, in which the base portion is securely fixed to an optical bench and the laser beam deflecting portion is forced to oscillate substantially away from the natural resonant frequency of the scanning element, by a reversible electromagnet disposed in close proximity to a permanent magnet mounted to the rear surface of the laser beam deflecting portion.

Another object of the present invention is to provide such a laser beam scanning mechanism, in which the natural harmonic (i.e., resonant) frequency of the laser beam deflecting portion about the anchored base portion is mechanically-damped by adding a thin layer of flexible rubber material to the gap region of the scanning element during manufacture, and the laser beam deflecting portion is forcibly driven by a reversible electromagnet operated at a forcing (i.e., driving) frequency tuned substantially away (i.e., off) from the natural resonant frequency of the laser beam deflecting portion.

Another object of the present invention is to provide such a laser beam scanning mechanism, in which the steady-state frequency of oscillation of the laser beam deflecting portion is determined by the frequency of polarity reversal of the electromagnet, which is electronically controlled by the polarity of the electrical current supplied to the input terminals of the magnet coil of the reversible electromagnet.

Another object of the present invention is to provide such a laser beam scanning mechanism, in which the driving or forcing frequency of the electromagnet is selected to be at least ten percent off (i.e., greater or less than) the natural resonant frequency of the laser beam deflecting portion.

Another object of the present invention is to provide such a laser beam scanning mechanism, in which the steady-state (i.e., controlled) frequency of oscillation of the scanning element can be set at the time of manufacture to be any one of a very large range of values (e.g., 25–125 Hz) for use in both low-speed and high-speed laser scanning systems.

Another object of the present invention is to provide such a laser beam scanning mechanism having ultra-low power consumption, and a low operating current.

Another object of the present invention is to provide such a laser beam scanning mechanism, in which the angular sweep of the laser beam deflecting element is about thirty degrees (i.e., ±15° degrees) measured with respect to the point of pivot about the anchored base portion of the scanning element of the present invention.

Another object of the present invention is to provide such a laser beam scanning mechanism, in which the scanning element and electromagnet are mounted within an ultra-compact housing having integrated stops for limiting the sweep that the scanning element is permitted to undergo during operation.

Another object of the present invention is to provide such a laser beam scanning module for use in hand-held, body-wearable, and stationary bar code symbol reading systems having a 1-D laser scanning pattern.

Another object of the present invention is to provide a 2-D laser scanning module constructed from the assembly of a pair of 1-D laser scanning modules of the present invention.

Another object of the present invention is to provide a 2-D laser scanning module, in which the 2-D laser scanning pattern produced thereby is electronically-controlled by electronic circuitry used to produce current drive signals provided to the electromagnetic coils of the reversible electromagnets mounted within the laser beam scanning modules of the present invention.

Another object of the present invention is to provide a novel method for manufacturing scanning elements used in the laser beam scanning mechanisms and modules of the present invention.

A further object of the present invention is to provide a hand-supportable laser scanning bar code symbol reader employing the laser beam scanning module of the present invention, in order to selectively produce either a 1-D or 2-D laser scanning pattern for reading 1-D or 2-D bar code symbols, respectively.

A further object of the present invention is to provide a portable data (transaction) terminal having the laser beam scanning module of the present invention integrated therewith, in order to produce either a 1-D or 2-D laser scanning pattern by manual selection, or bar code symbol programming, for reading 1-D or 2-D bar code symbols, respectively.

A further object of the present invention is to provide a body-wearable transaction terminal having the laser beam scanning module of the present invention integrated therewith, in order to selectively produce either a 1-D or 2-D laser scanning pattern for reading 1-D or 2-D bar code symbols, respectively.

A further object of the present invention is to provide a body-wearable Internet-based transaction terminal having the laser beam scanning module of the present invention integrated therewith, in order to read 1-D or 2-D URL-encoded bar code symbols.

A further object of the present invention is to provide a 2-D laser scanning bar code symbol reader, in which a real-time analysis of the bar code symbol structure being scanned is used to automatically set the resolution of the 2-D laser scanning pattern in order to scan 2-D bar code symbols in an optimal manner.

These and other objects of the present invention will become apparent hereinafter and in the Claims To Invention.

BRIEF DESCRIPTION OF THE DRAWINGS

For a more complete understanding of the present invention, the appended figure drawings should be read in conjunction with the following Detailed Description of the Illustrative Embodiments, in which:

FIG. 7A is a schematic representation of the output clock signal used to synchronize the current drive signal supplied to the electromagnetic coil of the X-axis laser beam scanning module integrated into the ultra-compact laser scanning device of FIG. 5;

FIG. 7B is a schematic representation of the drive current signal supplied to the electromagnetic coil of the X-axis laser beam scanning module of the ultra-compact laser scanning device of FIG. 5;

FIG. 7C is a schematic representation of the voltage signal used to drive the electromagnetic coil of the Y-axis laser beam scanning module of FIG. 5 when a two-line raster scanning pattern is to be produced;

FIG. 7D is a schematic representation of the voltage signal used to drive the electromagnetic coil of the Y-axis laser beam scanning module of FIG. 5 when a four-line raster scanning pattern is to be produced;

FIG. 7E is a schematic representation of the voltage signal used to drive the electromagnetic coil of the Y-axis laser beam scanning module of FIG. 5 when an eight-line raster scanning pattern is to be produced;

FIG. 8A1 is plan view of the 1-D laser scanning pattern produced from the graphical representation of a one-dimensional (1-D) laser scanning pattern produced from the laser scanning module shown in FIGS. 5 through 7E, integrated within a hand-supportable bar code symbol reader;

FIG. 8A2 is an elevated side-view of the one-dimensional (1-D) scanning pattern produced from the laser scanning module of the present invention shown in FIGS. 5 through 7E, shown integrated within a hand-supportable bar code symbol reader;

FIG. 8B is an elevated side-view of a two-line raster scanning pattern produced from the laser scanning module of the present invention shown in FIGS. 5 through 7E, shown integrated within a hand-supportable bar code symbol reader;

FIG. 8C is an elevated side-view of a four-line raster scanning pattern produced from the laser scanning module of the present invention shown in FIGS. 5 through 7E, shown integrated within a hand-supportable bar code symbol reader;

FIG. 8D is an elevated side-view of a eight-line raster scanning pattern produced from the laser scanning module of the present invention shown in FIGS. 5 through 7E, shown integrated within a hand-supportable bar code symbol reader;

DETAILED DESCRIPTION OF THE ILLUSTRATIVE EMBODIMENTS OF THE PRESENT INVENTION

The illustrative embodiments of the present invention will be described with reference to the figure drawings wherein like elements and structures are indicated by like reference numbers.

Overview of the Laser Beam Scanning Mechanism of the Present Invention

Figure 1A:
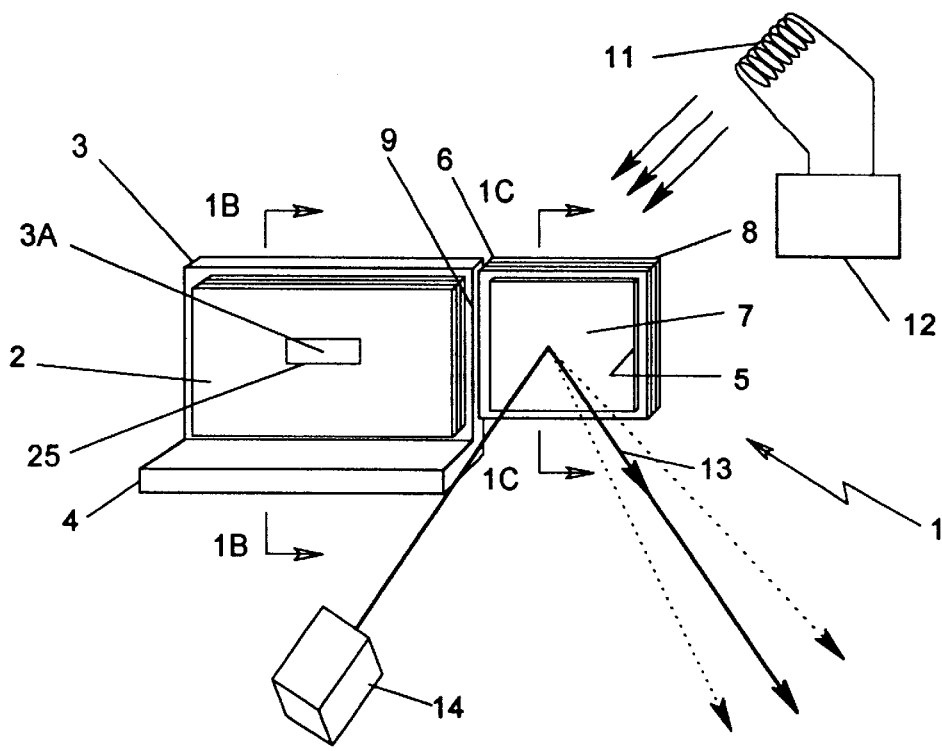
FIG. 1A is a schematic diagram of the laser beam scanning mechanism of the present invention, showing the anchored base portion thereof mounted on a support structure of an optical bench and the laser beam deflecting portion, extending from the base portion, bearing a light beam deflecting element on its front surface and a magnetic element on its rear surface for interaction with an externally generated magnetic force field produced by a miniature electromagnet driven by an electrical pulse train having a frequency which is controlled by an electronic signal generation circuit.

In FIG. 1A, the laser beam scanning mechanism of the present invention 1 is shown having a base portion 2 mounted (i.e., anchored) on a support structure 3 of an optical bench 4, and a laser beam deflecting portion 5 extending from the base portion, with a flexible gap portion 6 disposed therebetween.

As shown, the laser beam deflecting portion 5 bears a light deflecting element 7 on its front surface and a thin permanent magnet element 8 mounted on its rear surface. The light deflecting element 7 can be realized in a number of different ways, namely: as a light reflective element such as a mirror; as a light diffractive element such as a reflection or transmission hologram (i.e., HOE); as a light refractive element such as a lens element; or as any other type of optical element capable of deflecting a laser beam along an optical path as the laser beam deflecting portion 5 is oscillated about a fixed pivot point 9 defined at the interface between the anchored base portion and flexible gap portion of the scanning element. Light deflecting element 7 and magnetic element 8 can be mounted to the scanning element using an adhesive, or other fastening technique (e.g., soldering) well known in the art. In the illustrative embodiments disclosed herein, the laser beam deflecting portion 5 is oscillated about its fixed pivot point by producing a reversible magnetic force field (e.g., of about 260 Gauss) directed against the permanent magnet 8 (e.g., $20/1000$th thick) mounted on the rear surface of the laser beam deflecting portion.

In the illustrative embodiment, the positive polarity of the permanent magnetic field is directed away from the light deflecting element on the laser beam deflecting portion 5. The interaction of magnetic fields of opposite polarity produced by the permanent ferrite-type magnet 8 and a stationary magnetic field producing electromagnet 11 causes the laser beam deflecting portion 5 to oscillate about its fixed pivot point 9 at both its natural resonant frequency of oscillation, its harmonic modes of oscillation, as well as at the driving or forcing frequency at which the polarity of the magnetic force field (produced by electromagnet 11) reverses in response to amplitude variations in the electrical pulse train (driving the electromagnetic coil) which occur at a frequency controlled by an electronic signal generation circuit 12. In the illustrative embodiment, the angular excursion x in the x-direction scanning plane is about ±15° away from its non-deflected position. The function of the light deflecting element 5 is to deflect a focused light beam 13 (produced by source 14) along a scanning path in response to oscillation of the light beam deflecting portion 5 about the fixed pivot point 9, defined above.

Figure 1B:
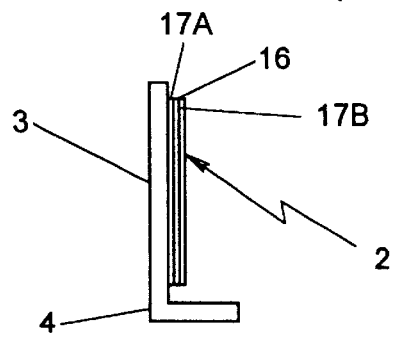
FIG. 1B is a cross-sectional view of the laser beam scanning mechanism of the present invention, taken along line 1B—1B of FIG. 1.
Figure 1C:
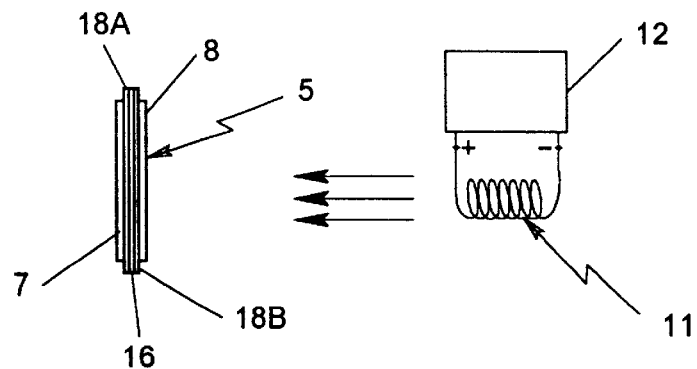
FIG. 1C is a cross-sectional view of the resonant scanning mechanism of the present invention, taken along line 1C—1C of FIG. 1.

As shown in FIGS. 1A, 1B, and 1C, the scanning element of the present invention has a laminated construction, wherein: the anchored base portion 2 and the laser beam portion 5, each consist of a thin layer of Kapton™ polyamide 16 sandwiched between a pair of thin layers of copper 17A and 17B, and 18A and 18B, respectively; and the flexible gap portion 6 consisting of the thin layer of Kapton™ (polyamide) plastic material and a thin layer of mechanically-damping film material, such as screenable silicone rubber (e.g., General Electric SLA 74015-D1), having a suitable durometer measure, (e.g., Shore A40). Notably, the thin layer of polyamide in the anchored base portion 2, the flexible gap portion 6 and the laser beam deflecting portion 5 is realized as a single unitary layer having a uniform thickness across these individual portions of the scanning element. The copper layers on opposite sides of the anchored base portion, the flexible gap portion and the laser beam deflecting portion of the scanning element are discrete elements of uniform thickness realized by precisely-controlled chemical-etching of the copper and polyamide layers during particular stages of the scanning element fabrication process described below.

Fabrication of the Scanning Element of the Present Invention

Figure 2A:
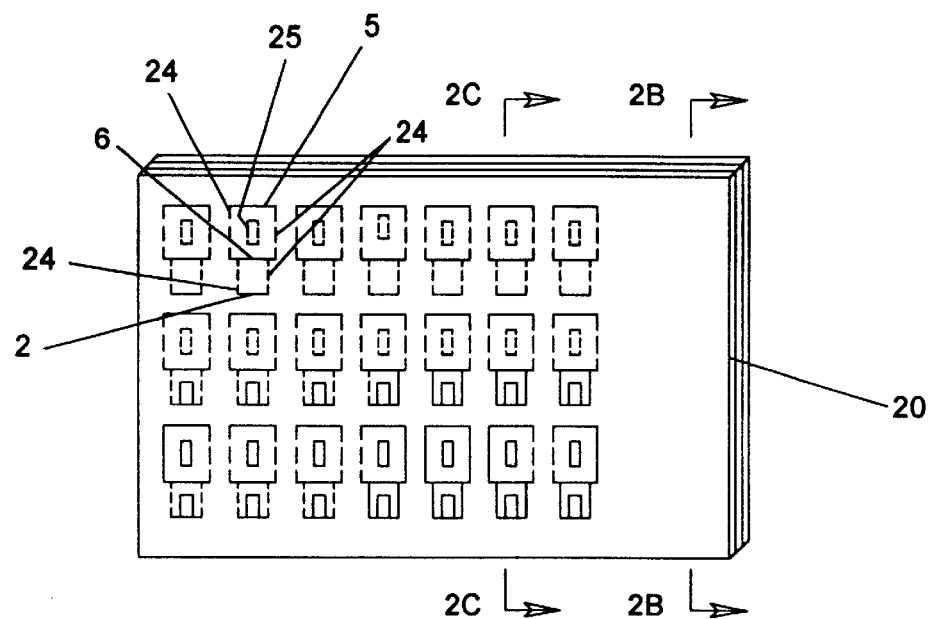
FIG. 2A is a perspective view of a chemically-etched sheet of double-sided copper-clad base material used to mass-manufacture the scanning element of the present invention.
Figures 2B, 2C:
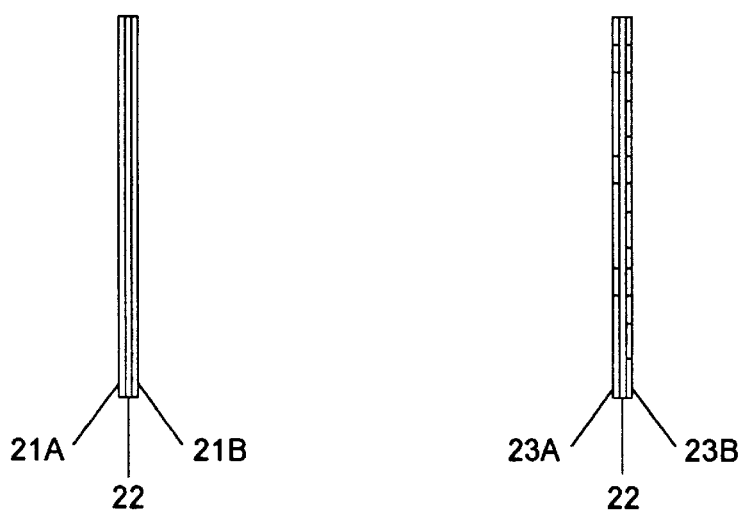
FIG. 2B is a cross-sectional view taken along line 2B—2B of FIG. 2A showing a portion of the double-sided copper-clad base material that has not been chemically etched.
FIG. 2C is a cross-sectional view taken along line 2C—2C of FIG. 2A showing a portion of the double-sided copper-clad base material that has been chemically etched so as to form seven rows of three scanning elements therefrom.

The preferred method of fabricating the flexible scanning element of the present invention will be described with reference to FIGS. 2A, 2B and 2C in the Drawings.

The first step of the fabrication method involves providing a sheet of base material 20, in which sheets of thin copper foil material 21A and 21B are laminated onto both front and back surfaces of a 12"×12" sheet of Kapton™ polyamide film material 22 using a epoxy adhesive. Suitable copper-laminated base material ("base material") can be obtained from Techetch, Inc., of Plymouth, Mass. The cross-sectional nature of this base material is shown in FIG. 2B.

Both sides of the 12"×12" sheet of base material 20 are screen-printed with a pattern of copper-protective ink ("photo-resist"). The copper-protective pattern is structured so that it covers those areas of the sheet where the copper elements associated with the anchorable base portion 2 and the laser beam deflecting portion 5 of many scanning elements are to be formed on the polyamide layer in a spatially-registered manner, as shown in FIGS. 2A and 2C. Those areas not covered by the copper-protective pattern (i.e., where the gap portions of the scanning elements are to be formed and scanning element mounting hole 25) are susceptible to the copper-etchant to be used in a subsequent etching stage. After the copper-protective pattern is printed, the sheet is exposed to the copper-etchant by dipping the sheet in a reservoir of the same. Thereafter, the chemically-etched sheet, having etched copper surfaces 23A and 23B, is rinsed in a conventional manner. At this stage of the fabrication process, the copper elements associated with the anchorable base portion and the laser beam portion of 400 scanning elements are formed on the 12"×12" sheet in a spatially-registered manner; also, the gap portions of the scanning elements made from polyamide material are also formed between corresponding base and laser beam deflecting portions.

The next stage of the fabrication process involves screen-printing a pattern of polyamide-protective ink on the chemically-etched sheet. The polyamide-protective pattern is structured so that it covers those areas of the sheet where the polyamide gap portions 6 have been previously formed, as well as very thin strips or string-like elements (e.g., called "stringers") between the copper elements associated with the anchorable base portion and the laser beam portion of neighboring scanning elements. Those areas of exposed polyamide not covered by the protective pattern described above (e.g., scanning element mounting hole 25) are susceptible to the polyamide-sensitive etchant that is to be used in a subsequent etching stage. After the polyamide-protective pattern is printed, the sheet is exposed to the polyamide-etchant by dipping the partially-etched sheet in a reservoir of the same. Thereafter, the etched sheet is rinsed in a conventional manner. At this stage of the fabrication process, the polyamide elements associated with the gap portion of the 400 scanning elements are formed on the 12"×12" sheet, along with the copper elements associated with the base portions and laser beam deflecting portions thereof. Each scanning element is suspended with respect to its neighboring scanning element by way of the formed "stringers" 24 which can easily be broken by gently pulling a fabricated scanning element from the nested matrix of scanning elements formed in the etched copper-cladded sheet described above.

While suspended within the nested matrix, a thin layer of GE silicone (Durometer of Share A 40) of about 0.01 inch thick is screened onto a single surface of the gap region of each scanning element. The function of this silicone film layer is to provide mechanical damping mechanism to the resonant scanning element being fabricated.

Once fabricated in the manner described above, the permanent (ferrite) magnets 8 and light deflecting (mirror) elements 7 can be attached to the laser beam deflecting portions of the etched scanning elements using CNC-based robotic machinery well known in the art. In addition, the completely fabricated scanning elements can then be mounted to their optical benches (or mounting brackets) using CNC-based machinery well known in the art.

Notably, while the above-described process involves treating single sheets of base material, it is understood that in alternative embodiments of the present invention, a roll of base material can be used (instead of sheets) and treated using a continuous version of the above-described fabrication process.

Tuning the scanning element described above is relatively easy. It has been determined that the natural resonant frequency of oscillation of the light beam deflecting portion 5 is functionally related to: the thickness of the layer of flexible material 16; the physical dimensions of the flexible gap portion 6; the total mass of the laser beam deflecting portion, including the laser beam deflecting element (e.g., mirror) 7 and the permanent magnet 8. For a given permanent magnet, mirror element and base material (e.g., double-sided copper-clad polyamide), the natural resonant frequency of the laser beam deflecting portion about the fixed pivot point 9 can be precisely controlled by controlling the physical dimensions of the flexible gap region 6 during the copper etching stage of the scanning element fabrication process (i.e., printing the copper-protective and polyamide-protective pattern). This technique enables tuning the scanning element over a fairly broad range of operation. For a greater degree of tuning, it might be desirable or necessary to use a different base material, in which the thickness of the polyamide layer is thicker (where a higher scanning frequency is required), or thinner (where a lower scanning frequency is required).

While sophisticated mathematical models of the scanning element can be created to assist in the design process of the scanning element hereof, it has been found that straight forward experimentation can be used to determine the gap dimensions for a desired natural operating frequency. As the forced frequency of operation is the "operating frequency" of the scanning mechanism, the designer will start with the desired operating frequency (i.e., set by scanning speed requirements, bar code symbol resolution, signal processing limitations, etc.) and figure out what the natural resonant frequency of the scanning element must be (e.g., at least 10% away from the forced frequency of operation). Knowing the approximate range of the natural resonant frequency of the scanning element under design, the designer can then experiment (or model) in a straight forward manner to determine the physical dimensions required to attain the desired natural frequency of oscillation for a scanning element fabricated from a particular base material.

Using the above-described fabrication technique, scanning elements have been fabricated with natural resonant frequencies of operation within the range of about 50 Hz to about 250 Hz.

In Table I below, the resonant frequencies are listed for a number of different scanning elements (1) fabricated using base material having a polyamide thickness of 0.001 inches, and 2.0 ounce double-sided copper cladding, and (2) having a laser beam deflecting portion (including a mirror and permanent magnet) with a total mass of about 0.11 grams (i.e., where the ferrite magnet has a mass of 0.04 grams and mirror having mass of 0.03 grams).

| Double sided copper clad | 2.0 oz |
|---|---|
| Polyamide layer thickness | 0.001 inch |
| Mass of Ferrite Magnet | 0.04 grams |
| Mass of Mirror Element | 0.03 grams |
| Total Mass of Light Beam Deflecting Portion | 0.11 grams |
| Gap Region Height | 0.160 inch |
| Thickness of Silicon Damping Film Layer Applied over one side of Gap Region | 0.01 inch |
| Durometer of Silicone Damping Film Layer | Shore A 40 |

| RESONANT FREQUENCY (Hz) | GAP REGION WIDTH (Inch) |
|---|---|
| 25 | .065 |
| 26.5 | .060 |
| 28.0 | .055 |
| 29.5 | .050 |
| 31.0 | .045 |
| 32.5 | .040 |
| 34.0 | .035 |
| 35.5 | .030 |
| 37.0 | .025 |
| 38.5 | .020 |
| 40.0 | .015 |

In Table II below, the resonant frequencies are listed for a number of different scanning elements (1) fabricated using base material having a polyamide thickness of 0.003 inches, and 2.0 ounce double-sided copper cladding, and (2) having a laser beam deflecting portion (including a mirror and permanent magnet) with a total mass of about 0.11 grams (i.e., where the ferrite magnet has a mass of 0.04 grams and mirror having mass of 0.03 grams).

| Double sided copper clad | 2.0 oz |
|---|---|
| Polyamide layer thickness | 0.003 inch |
| Mass of Ferrite Magnet | 0.04 grams |
| Mass of Mirror Element | 0.03 grams |
| Total Mass of Light Beam Deflecting Portion | 0.11 grams |
| Gap Region Height | 0.160 inch |
| Thickness of Silicon Damping Film Layer Applied over one side of Gap Region | 0.01 inch |
| Durometer of Silicone Damping Film Layer | Share A 40 |

-continued

| RESONANT FREQUENCY (Hz) | GAP REGION WIDTH (Inch) |
|---|---|
| 75 | .065 |
| 79.5 | .060 |
| 84 | .055 |
| 88.5 | .050 |
| 93 | .045 |
| 97.5 | .040 |
| 102 | .035 |
| 106.5 | .030 |
| 111 | .025 |
| 115.5 | .020 |
| 120 | .015 |
| 124.5 | .010 |

Laser Beam Scanning Module of the First Illustrative Embodiment

Figure 3A:
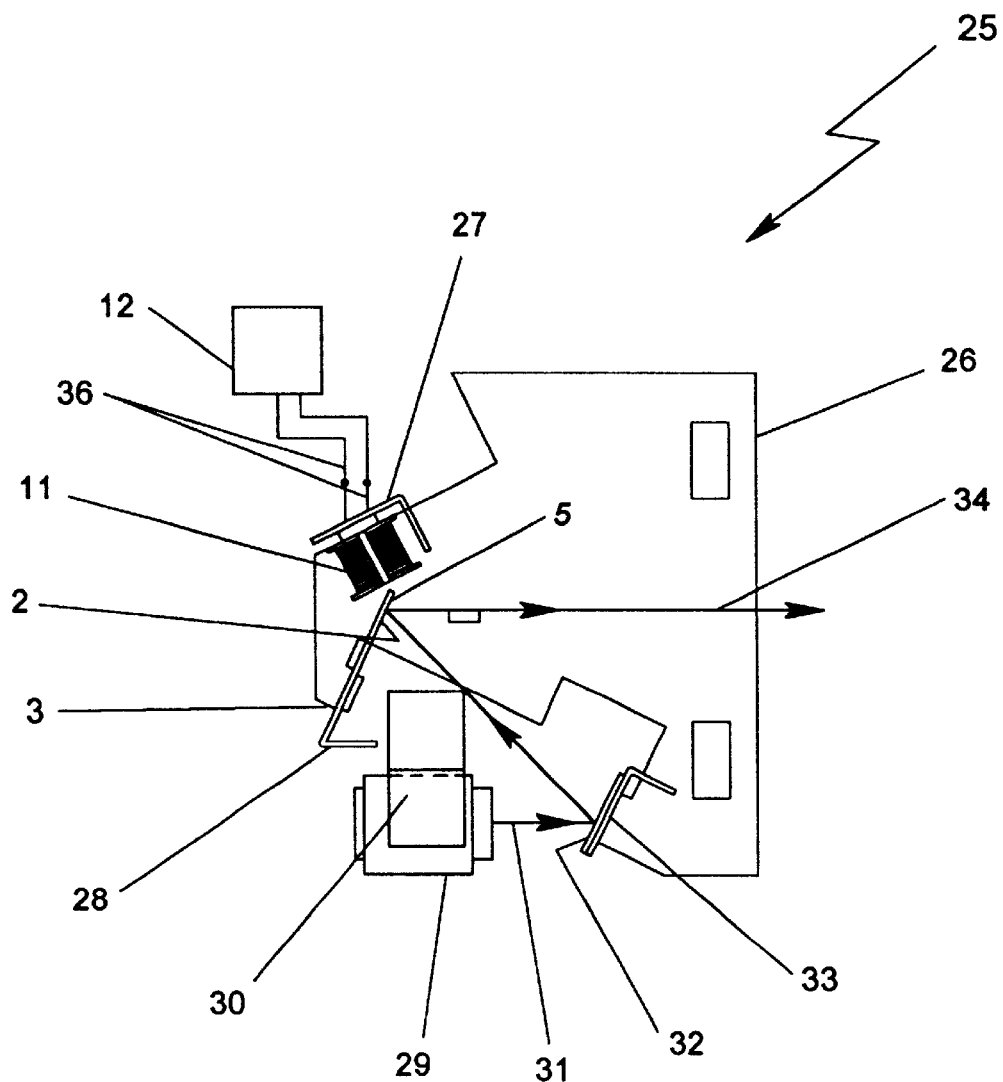
FIG. 3A is a schematic diagram of a first illustrative embodiment of a miniature laser scanning engine realized upon an optical bench using a laser diode, a stationary folding mirror, an electromagnetic coil, and the laser beam scanning mechanism of the present invention shown in FIG. 1A.

In FIG. 3A, a laser beam scanning mechanism of the first illustrative embodiment is shown realized on an optical bench 26 of planar dimensions. Magnetic-field producing coil (i.e., electromagnetic coil) 11 is supported upon a first projection (e.g., bracket) 27 which extends from the optical bench. The scanning element of the present invention described above is mounted upon a second projection 28 which extends from the optical bench. The permanent magnet 8 is placed in close proximity with the magnetic-field producing coil 11, as shown in FIG. 3A. A visible laser diode (VLD) 29 is mounted adjacent the scanning element (by way of bracket 30) so that its output laser beam 31 is directed towards a beam folding mirror 32, supported from a third projection (bracket) 33 extending from the optical bench. The laser beam reflected off the beam folding mirror 32 is directed towards the laser beam deflecting portion 5 of the scanning element and reflects outwardly along the projection axis 34 of the scanning module. The scanning element is forced into oscillatory motion by driving the electromagnetic coil 11 with a voltage signal having a frequency substantially off the resonant frequency of the scanning element (e.g., by at least 10%).

Figure 3B:
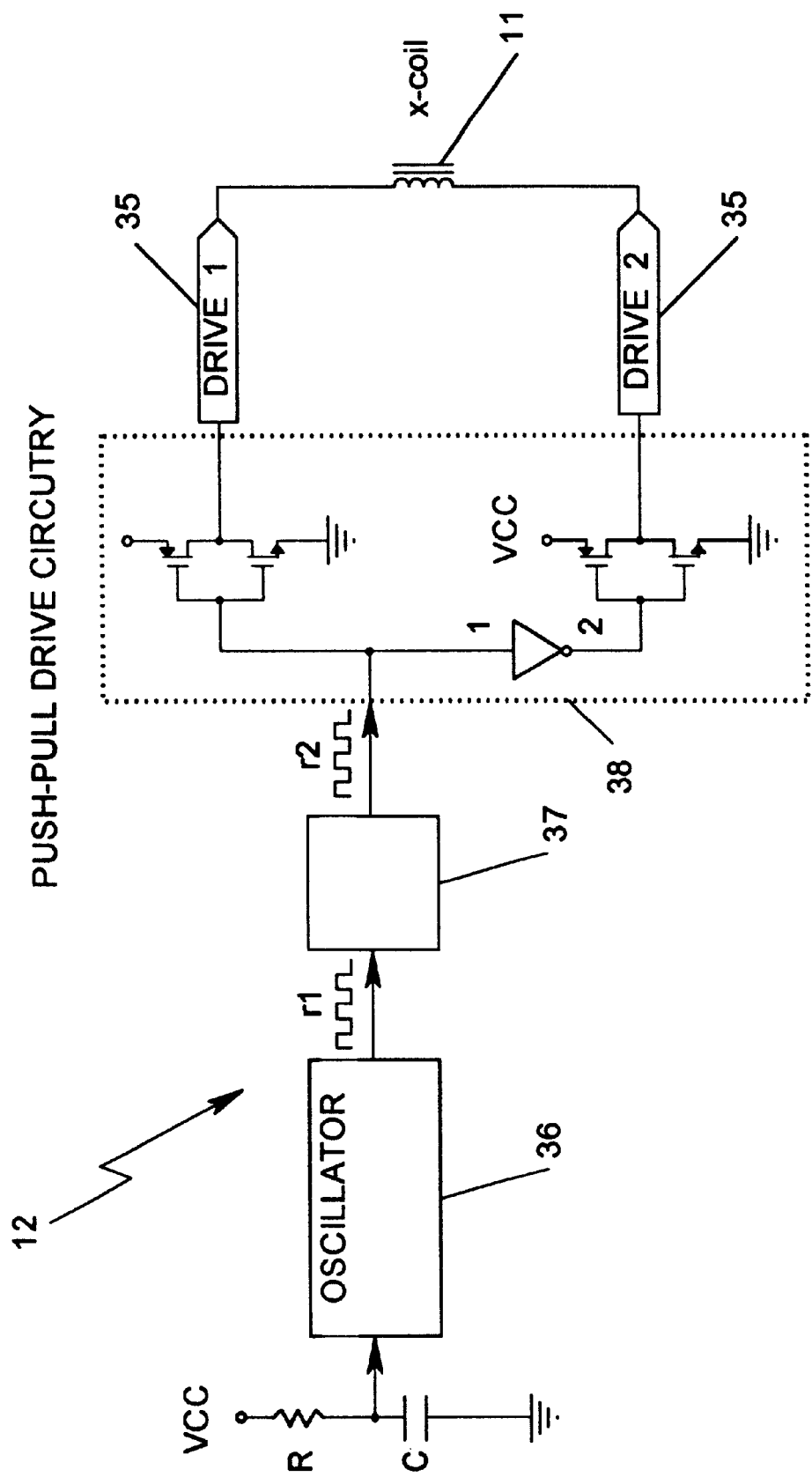
FIG. 3B is a schematic diagram of an electronic circuit for producing the voltage drive signal applied to the magnetic field producing coil in the scan engine of FIG. 3A.

In the preferred embodiment, the electromagnetic coil 11 is driven in a push-pull mode, in which the magnetic polarity of the coil reverses periodically at rate determined by the amplitude variation of the voltage signal applied across the terminals 36 of the electromagnetic coil 11. A suitable voltage waveform for driving the electromagnetic coil 11 in the laser beam scanning mechanism of FIG. 3A can be generated by the electronic circuit 12 shown in FIG. 3B. As shown, electronic circuit 12 comprises: a clock generator 36 for producing a clock signal having a frequency $f_1$ determined by an external RC network, comprising resistor R and capacitor C, where the clock frequency thereof $f_1$ is determined by the expression $f_1=1/2.07$ RC; a divider circuit 37 for dividing clock frequency $f_1$ by a factor of twenty (20) to produce $f_2=f_1/20$; and a conventional push-pull current drive integrated circuit (IC) chip 38 connected to magnetic-field producing coil 11 in an electrically-floating manner (i.e., not connected to electrical ground) as shown in FIG. 3A. The RC network is used to set the frequency of the drive current in coil 11, which sets the scan rate (e.g., sweeps or scan lines per second) of the scanning mechanism.

In the illustrative embodiment, where for example the resonant frequency of the scanning element is about 34 Hz, the controlled frequency of the laser beam scanning mechanism should be set at about 28 Hz or 41 Hz (e.g., ±7 Hz about the resonant frequency) which, in turn, determines the scan rate of the laser scanning module to be 56 or 82 scan lines per seconds, respectively. The controlled frequency of the scanning mechanism is set by adjusting the frequency of the drive current signal in coil 11. The scanning mechanism of the present invention can be designed to provide scan rates higher than 250 scan lines per second (e.g., by using a thicker polyamide layer and/or narrowing the gap region of the scanning element.

Laser Beam Scanning Module of the Second Illustrative Embodiment

Figure 4A:
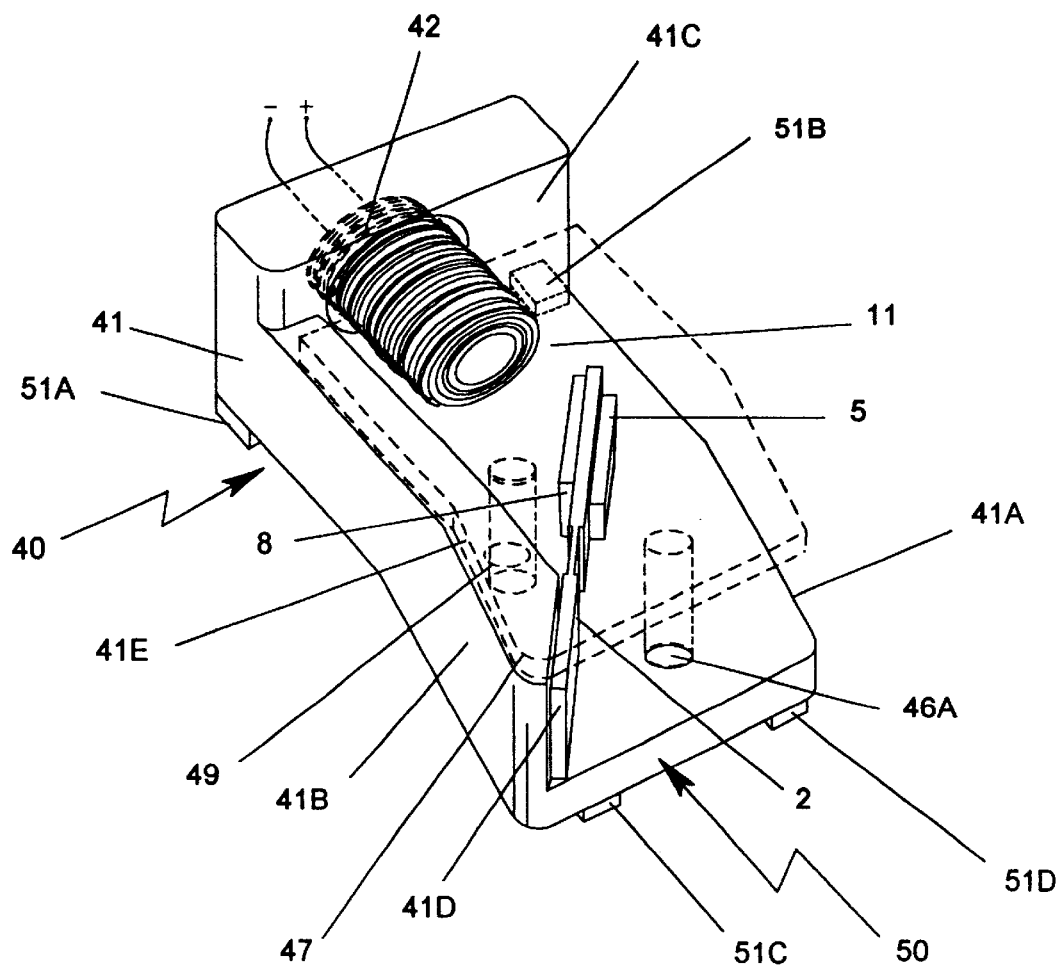
FIG. 4A is a perspective view of a second illustrative embodiment of a miniature laser beam scanning module realized using an ultra-compact plastic housing in which the laser beam scanning mechanism of the present invention shown in FIG. 1A is mounted.
Figure 4B:
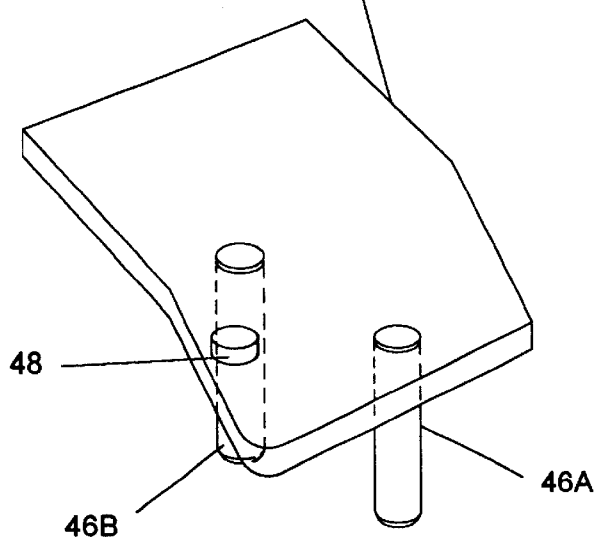
FIG. 4B is a perspective view of a subcomponent of the scanning mechanism of the second illustrative embodiment which is snap connected to the housing shown in FIG. 4A and functions to delimit the angular excursion under which the scanning element hereof is permitted to go during scanner operation.

In FIGS. 4A and 4B, a second illustrative embodiment of a miniature laser beam scanning module 40 is shown realized using an ultra-compact plastic housing 41, in which the electromagnetic coil 11 and the laser beam scanning mechanism of FIG. 1A are mounted. As shown, plastic housing 41 comprises a bottom plate 41A, side walls 41B and 41C extending from the base plate, and a surface 41D for mounting the anchorable base portion 2 of the scanning element hereof thereto. Housing 41 also is provided with a recess 42 in side wall 41C, within which the magnetic-field producing coil 11 can be mounted in a press-fit manner. When assembled, the scanning element extends towards the central axis of the magnetic-field producing coil 11 so that the permanent magnet 8 is closely positioned adjacent one end of the coil, while the other end thereof, mounted on a support post 43 in recess 42, is mounted thereto. The terminals of the magnetic-field producing coil can be passed through small holes drilled in side wall 41C. Bottom plate 41A has a pair of holes 45A and 45B formed therein for receiving the ends of posts 46A and 46B which extend from cover plate 47. A projection 48 on cover plate 47 snaps into hole 49 in the top surface 41E of the side wall 41B, while mounting posts 46A and 46B snap within holes 45A and 45B, respectively. When the cover 47 is assembled with the plastic housing 41, the posts 46A and 46B straddle the flexible gap portion 6 of the scanning element and function to limit the maximum angular swing thereof if and when the scanning mechanism is subjected to excessive external forces as might be experienced when dropped to the ground. In such an assembled configuration, the laser beam scanning module has a scanning aperture 50, through which the laser beam can be swept along either a 1-D or 2-D scanning pattern. Preferably, all of the components of the housing described above are fabricated using injection molding technology well known in the art.

As shown, the bottom plate of the module includes a set of bottom projections 51A, 51B, 51C and 51D which can be used to mount the plastic housing with respect to a primary optical bench or other surface within a host system incorporating the same.

Laser Beam Scanning Module of the Third Illustrative Embodiment

Figure 5:
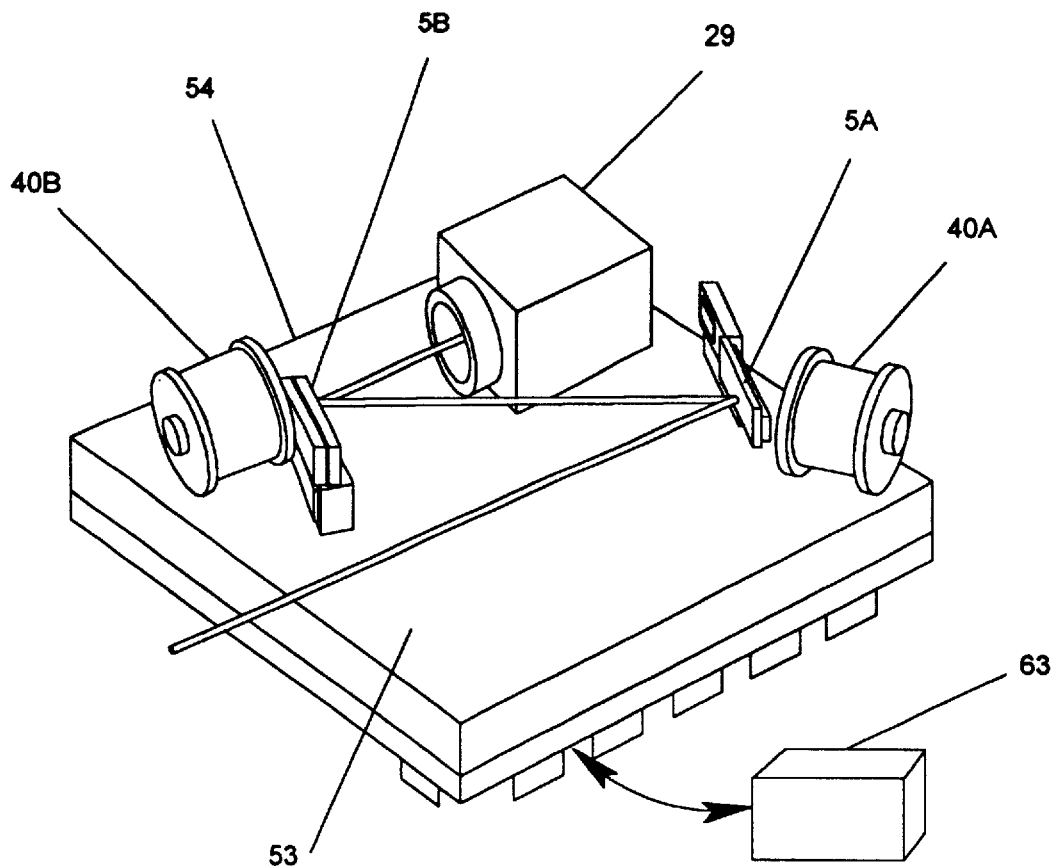
FIG. 5 is a perspective diagram of third illustrative embodiment of the present invention, in which a pair of miniature laser beam scanning modules shown in FIG. 4A are configured on an optical bench to form an ultra-compact laser beam scanning device capable of producing either a 1-D or 2-D raster-type laser scanning pattern by manually depressing an externally-mounted button or switch, or by reading a predetermined bar code symbol encoded to automatically induce a particular mode of scanner operation.

A third illustrative embodiment of the present invention is shown in FIG. 5. In this illustrative embodiment, a pair of miniature laser beam scanning modules 40A and 40B, described in detail above, and visible laser diode (VLD) 29 are configured onto an optical bench 53 in order to form an ultra-compact laser beam scanning device capable of selectively producing a 1-D or 2-D (raster-type) laser scanning pattern under the control of electronic circuitry 54. The optical bench 53 can be mounted within a hand-held scanner housing, a countertop housing, or any other housing geometrically adapted to a particular application. As shown in FIG. 5, the optical bench 53 allows the modules 40A and 40B to be mounted relative to each other so that the scanning aperture 5A of the first module is orientable along the x-axis of the scanning field, while the scanning aperture 5B of second module is orientable along the y-axis thereof. In some applications, it might be desired to provide the optical bench with beam folding mirrors in order to fold the produced scanning beam in a particular manner. In the illustrative embodiment, the x-direction scanning element undergoes a maximum angular excursion of about ±15° about its non-deflected position, whereas the maximum angular excursion for the y-direction scanning element is about ±1.5° about the non-deflected position thereof.

Figure 6:
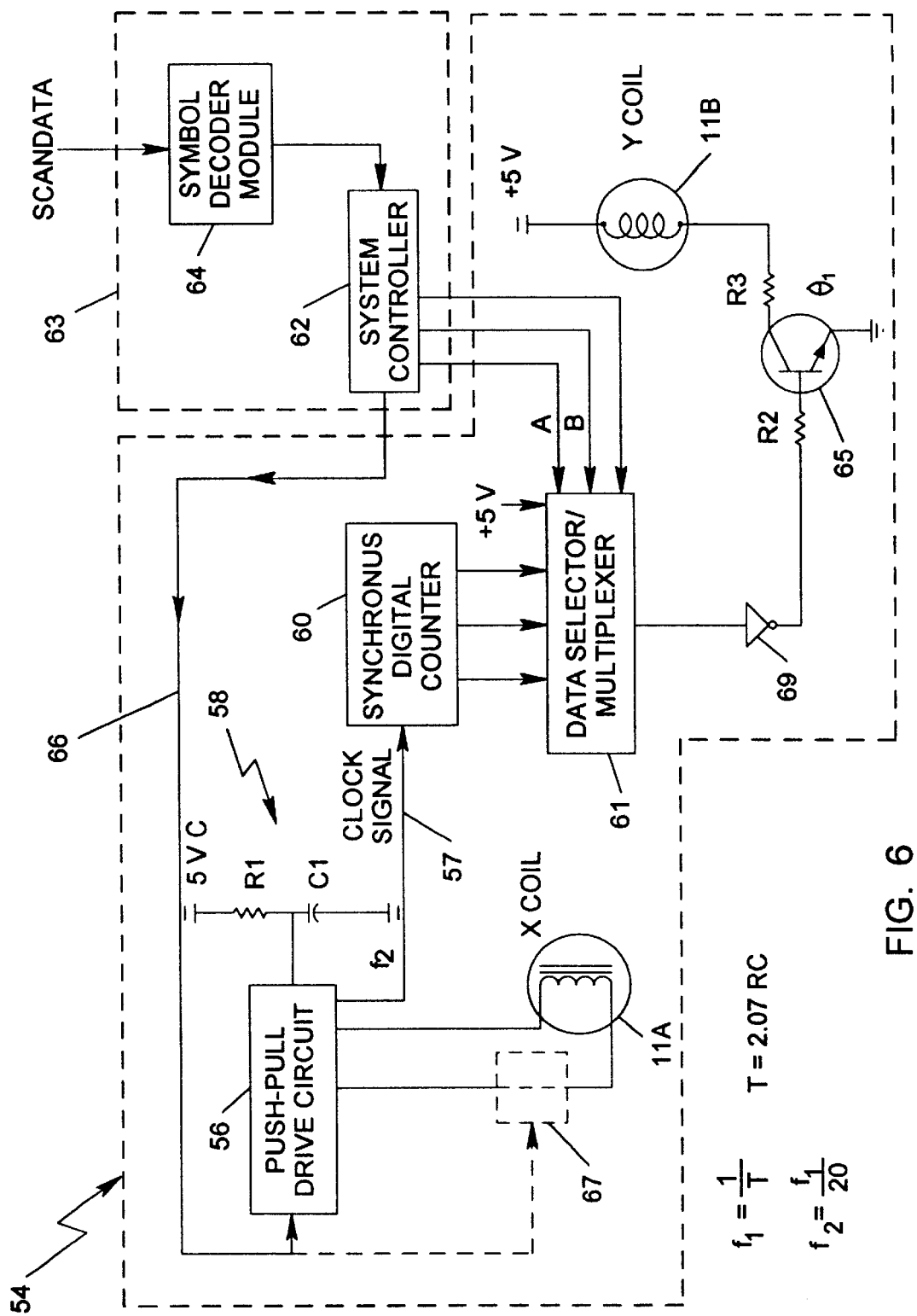
FIG. 6 schematic, diagram of circuitry for producing synchronized drive signals for the ultra-compact 1-D/2-D laser scanning device shown in FIG. 5, and automatically setting the resolution of the 2-D laser scanning pattern produced therefrom in response to a real-time analysis of scanned 2-D bar code symbols.

As shown in FIG. 6, the function of electronic circuitry 54 is to produce drive signals for synchronously driving the laser scanning modules 40A and 40B so that 1-D or 2-D scanning patterns are produced under electronic control. This circuitry can be realized on a small printed circuit (PC) board attached to the optical bench 53 or elsewhere within the host system housing.

In the illustrative embodiment, a push-pull driver IC 56 is used to produce a current drive signal for the x-axis magnetic-field producing coil 11A. The clock frequency of the clock signal 57 produced from push-pull drive circuit 56 is set by an external resistor/capacitator network 58 (R1 and C1) connected to a 5 Volt power supply in a manner well known in the art. The output clock frequency shown in FIG. 7A serves as a base or reference signal for the operation of circuit 54. As shown, the output clock signal is provided as input to a synchronous (4-bit) binary counter 60 which produces a plurality of output clock signals having different clock rates (e.g., 2, 4, 8, etc.) In turn, these output clock signals, along with a DC signal, are provided as input signals to a multi-channel data selector/multiplexer 61 (e.g., whose control or gating signals are provided by the system controller 62 of the host system (e.g., hand-held bar code symbol reader, countertop scanner, vending machine, etc.) 63. The single output of the data-selector/multiplexer 61 is provided as input to an inverter 69 which is used to drive a transistor (Q1) 65 through a resistor R2 connected to the base thereof, with the transistor emitter connected to electrical ground. In turn, the collector and emitter junction of the transistor 65 are connected in series with a current limiting resistor R3, a y-axis magnetic-field producing coil 11B and the 5 Volt power supply.

In the illustrative embodiment, the system controller 62 is operably connected to the symbol decoding module 64 of the host system 63. Typically, the symbol decoding module is a programmed microprocessor capable of decoding 1-D and 2-D bar code symbols using autodiscrimination techniques and the like. An exemplary system architecture for the host system 63 is described in great detail in U.S. Pat. Nos. 5,260,553, 5,340,971, and 5,557,093, incorporated herein by reference. During decode processing, the symbol decoding module 64 carries out one more 2-D decoding algorithms, each embodying "Scan-Pattern Optimization Control Logic". According to such control logic, if during the 2-D decoding process, a bar code symbol is decoded, then the decoding module proceeds to determine how many rows of scan data are contained in the 2-D bar code symbol. This is achieved by reading the "row" indication field in the decoded line of scan data and determining the number of rows within the scanned 2-D bar code symbol. When this information is recovered by the symbol decoding module, it is then provided to the system controller 62. In turn, the system controller uses this information to generate a control signal for the data-selector/multiplexer 61. The control signal selects a signal (at the multiplexer's input) which drives the y-axis magnetic-field producing coil 11B in a manner such that the 2-D bar code symbol is optimally scanned.

For example, if the symbol decoding module detects a 1-D bar code symbol, then the system controller will automatically produce a control signal that causes the multiplexer 61 to select a DC voltage, thereby causing the y-axis magnetic-field producing coil 11B to remain pinned down, and prevented from deflecting the laser beam along the y-axis of the scanning beam.

If the symbol decoding module 64 detects a "Post-Net" type 2-D bar code symbol, then the system controller will produce a control signal that causes the multiplexer to select a clock signal that causes the y-axis magnetic-field producing coil 11B to produce a 2-line raster scanning pattern. If the symbol decoding module detects a "PDF or equivalent" type 2-D bar code symbol, then the symbol decoder determines how many rows of data are contained in the PDF code symbol. Based on the number of rows of data contained within the scanned 2-D bar code symbol, the system controller will dynamically generate a control signal that causes the y-axis magnetic-field producing coil to produce an optimal number of scan lines in the scanning pattern, related to the number of rows of data contained within the scanned code symbol.

If the symbol decoding module determines that the PDF symbol has between 2–4 rows of data, then the system controller will produce a control signal that causes the multiplexer to select a clock signal that causes the y-axis magnetic-field producing coil 11B to produce a 2-line raster scanning pattern. If the symbol decoding module determines that the PDF symbol has between 5–10 rows of data, then the system controller will produce a control signal that causes the multiplexer to select a clock signal that causes the y-axis magnetic-field producing coil 11B to produce a 4-line raster scanning pattern. If the symbol decoding module determines that the PDF symbol has 11 or more rows of data, then the system controller will produce a control signal that causes the multiplexer to select a clock signal that causes the y-axis magnetic-field producing coil 11B to produce an 8-line raster scanning pattern.

During operation of the electronic drive circuitry of FIG. 6, the push-pull drive IC 56 produces a clock signal 57 as shown in FIG. 7A. Based on this clock signal, a current drive signal shown in FIG. 7B is produced for driving the x-axis magnetic-field producing coil. As the operation of the x-axis magnetic-field producing coil 11A is reversible (i.e., its magnetic polarity reverses in response to current direction reversal therethrough), the current direction is referenced about a zero milliampere (0.0 mA) value. Each time the current drive signal changes direction through windings of the x-axis magnetic-field producing coil 11A, so too does the magnetic polarity of the magnetic-field produced thereby and thus the direction of deflection of the scanning element along the x-axis.

To prevent deflection of the laser beam along the y-axis, and thus create a 1-D scanning pattern, the system controller will select a DC voltage at multiplexer 61. The selected DC voltage will forward bias the current drive transistor 65 so that a constant current flows through y-axis magnetic-field producing coil 11B, pinning the scanning element of the y-axis scanning module and preventing deflection of the laser beam along the y-axis in response to base clock signal 57 shown in FIG. 7A.

To produce a 2-D laser scanning pattern, the system controller will select one of the voltage signals shown in FIGS. 7C through 7E for driving current drive transistor 65 connected to the y-axis magnetic-field producing coil 11B. As illustrated in FIG. 6, whenever the amplitude of the selected voltage signal is below a predetermined threshold (e.g., 0 Volts), then invertor 69 will produce an output voltage which forward biases the current drive transistor 65, causing electrical current to flow through the y-axis magnetic-field producing coil and a magnetic field produced in response thereto. Under such conditions, the y-axis magnetic-field producing coil 11B deflects the laser beam along the y-axis. When the amplitude of the selected voltage signal rises above the threshold level, the output of the invertor 69 decreases so that the current drive transistor 65 is no longer forward-biased. This condition causes current flow through the y-axis magnetic-field producing coil to cease and the magnetic field therefrom to collapse, thereby allowing the scanning element to deflect the laser beam in the opposite direction.

When the selected control voltage changes polarity, the y-axis coil is once again actively driven and the scanning element thereof deflected, causing the horizontally deflected laser beam to be deflected in along the y-axis. The number of horizontal scan lines produced each time the laser beam is deflected along the y-axis depends on how slowly the amplitude of the selected control voltage (from the multiplexer) changes as the x-axis magnetic-field producing coil deflects the laser beam along the x-axis each time the current drive signal shown in FIG. 7B undergoes a signal level transition from high to low.

Notably, the selected control voltage shown in FIG. 7E allows eight horizontal scan lines to be created along the x-axis before it undergoes its signal level transition, which in effect triggers the repositioning of the laser beam along the start position of the y-axis. The finish position along the y-axis depends on the time that the selected control voltage remains below the threshold voltage, as well as other factors (e.g., scanning aperture of the modules, host scanner, etc.).

Using the above-described principles of the present invention, clearly it is possible to produce 2-D raster scanning patterns having a number of horizontal scan lines that are optimally matched to the number of rows of data within virtually any 2-D bar code symbol being scanned.

In an alternative embodiment of the present invention, it is possible for the symbol decoding module 64 to collect information regarding (i) the number of rows in a scanned 2-D bar code symbol and (ii) the length of the data rows. The system controller 62 can then use the row number information to set the number of horizontal scan lines to be produced in the scanning pattern, while the row length information can be used to set the length of the scan lines by limiting the amplitude of electrical current through the x-axis magnetic-field producing coil 11A.

As shown in FIG. 6, such control can be achieved by controller 62 sending a control signal 66 to push-pull drive circuit 56, or an active element 67 provided in series with electromagnetic coil 11A for the purpose of actively controlling the electrical current flowing therethrough.

In another embodiment of the present invention, it is possible for the symbol decoding module to collect information regarding (i) the number of rows in a scanned 2-D bar code symbol, (ii) the length of the data rows, and (iii) count data representative of the distance of the symbol in the scanning volume. The system controller can then use the row number information to set the number of horizontal scan lines to be produced in the scanning pattern, and the row length information and count data to set the length of the horizontal scan lines (by limiting the amplitude of electrical current through the x-axis magnetic-field producing coil 11A by current control signal 66). By controlling such scanning parameters, the system controller of the host system can achieve real-time control over the aspect-ratio of the 2-D scanning pattern.

An advantage of such system functionalities will be to improve the visibility of the scanned laser beam, and optimize data collection operations as the laser beam will only be scanned over regions in space where symbol data is likely present.

In FIGS. 8A1 and 8A2, the laser scanning module of the present invention is shown being operated in its 1-D Scanning Mode. In this mode, a scan pattern is produced having a single horizontal scan line. In FIGS. 8B through 8D, the laser scanning module is shown being operated in different variations of its 2-D Scanning Mode, in which a raster-type scanning pattern is produced. In each of these figures, a different raster scanning pattern is shown being produced with a different number of scan lines. Preferably, the particular number of scan lines produced are automatically selected by the system controller of the present invention, as described in great detail above.

Scanning mode selection can be realized in a number of different ways. One way would be to mount an external button on the housing of the bar code symbol reader into which the scanning module has been integrated. When this mode selection button is depressed, the reader automatically enters a particular scanning mode. Alternatively, scanning mode selection can be achieved by way of reading a predetermined bar code symbol encoded to automatically induce a particular mode of operation. When a predetermined bar code symbol is read, the scanning module automatically enters the scanning mode represented by the scanned bar code symbol.

Illustrative Embodiments of Bar Code Scanning Systems Embodying the Laser Scanning Module of the Present Invention In general, the laser scanning modules of the present invention can be embodied within diverse types of bar code driven systems, including hand-held bar code symbol readers, body-wearable bar code symbol readers, fixed counter scanners, transaction terminals, reverse-vending machines, CD-juke boxes, etc. In FIGS. 9A through 11, a few illustrative examples are shown where such laser scanning modules can be embodied. Such examples are not intended to limit the scope of the present invention, but simply illustrate several of the many environments that the laser scanning modules of the present invention might be embedded.

Figure 9A:
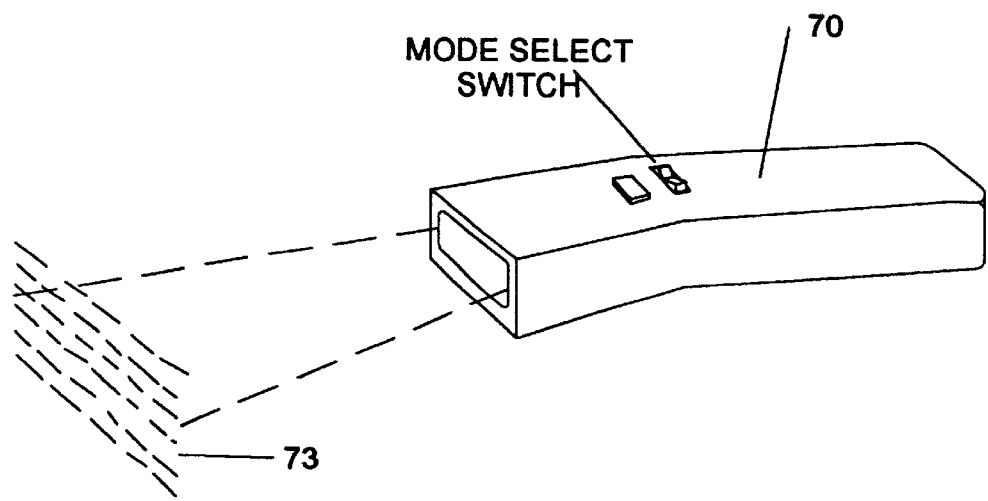
FIG. 9A is a schematic diagram of the hand-supportable multi-scan pattern generating bar code symbol reader of the present invention shown being used in its hands-free (i.e., stand-supported) mode of operation.
Figure 9B:
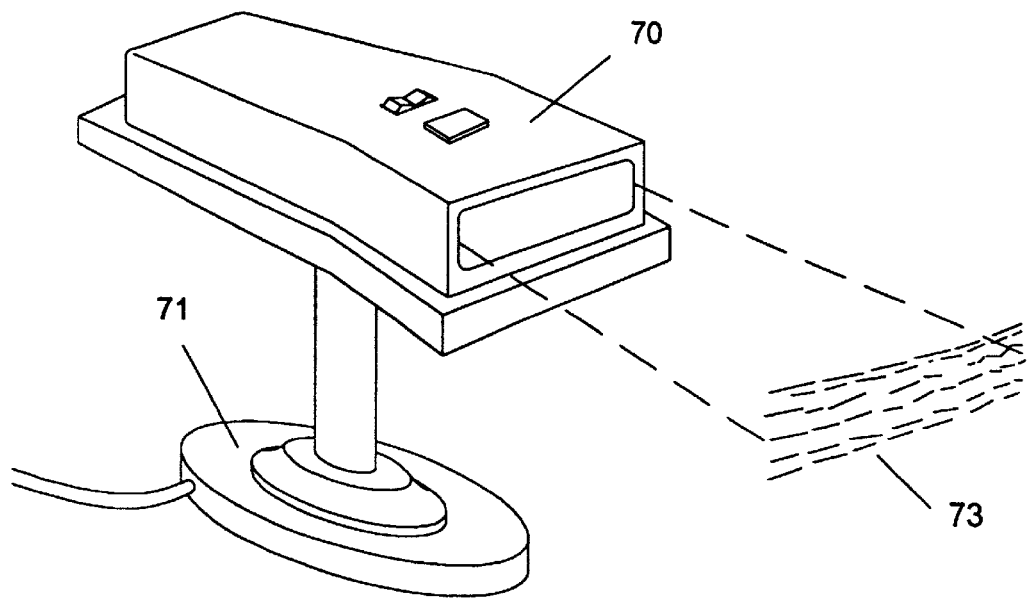
FIG. 9B is a schematic diagram of the hand-supportable multi-scan pattern generating bar code symbol reader of the present invention shown being used in its hands-free (i.e., stand-supported) mode of operation.

In FIGS. 9A and 9B, the laser scanning module of FIG. 5 is shown embodied within a hand-supportable bar code symbol reader 70 of the type described in U.S. Pat. Nos. 5,260,553 and 5,340,971, incorporated herein by reference. In FIG. 9, the scanner is shown being used in its hands-on mode of operation. In FIG. 9B, the scanner is shown being used in its hands-free mode of operation, where it is supported within a stand 71. In either of these modes of operation, 1-D or 2-D laser scanning patterns 73 can be automatically produced from the bar code symbol reader in the manner described hereinabove.

Figure 10:
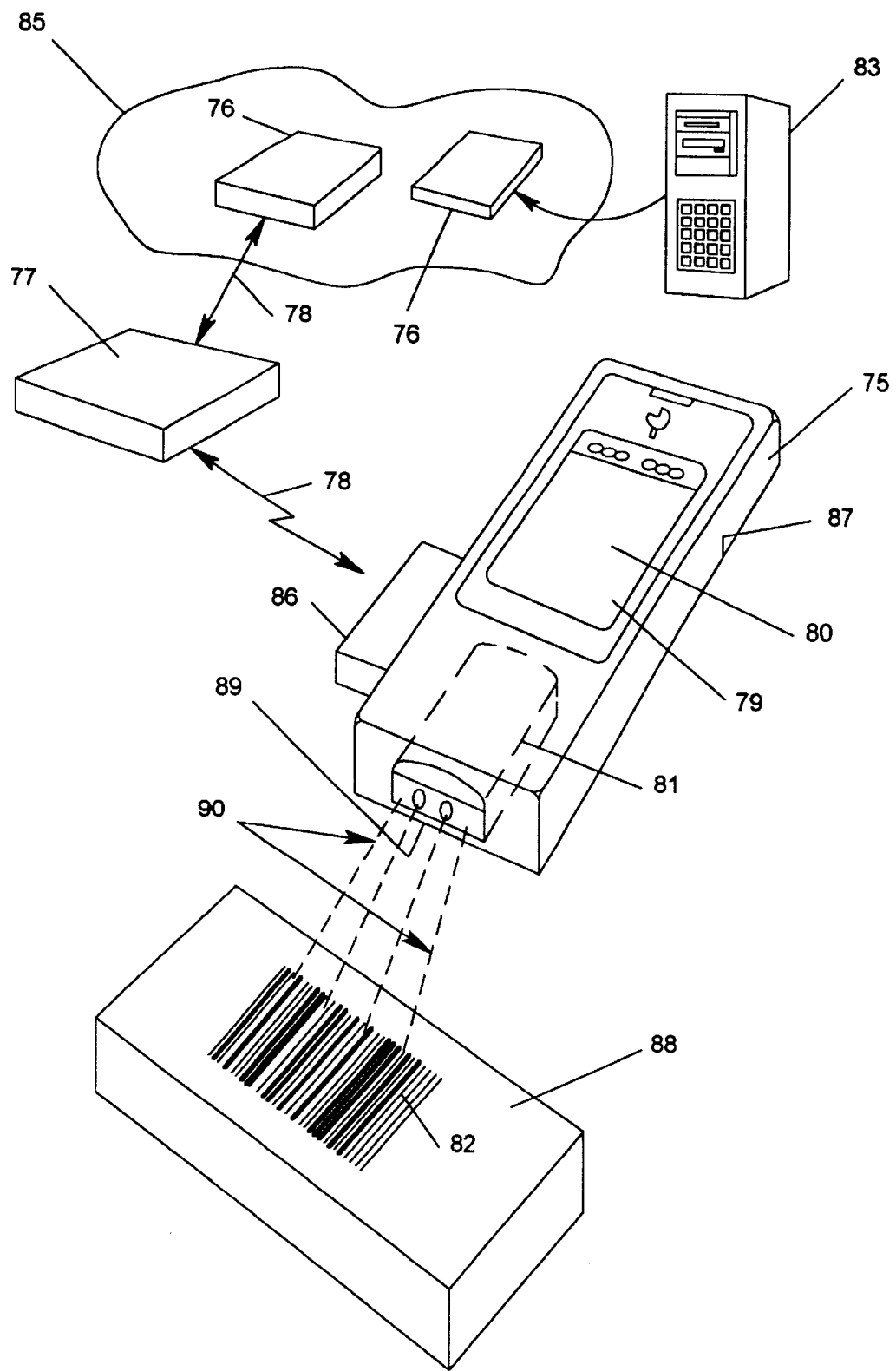
FIG. 10 is a perspective view of a portable Internet-based data transaction terminal according to the present invention, in which the laser beam scanning module of FIGS. 5 and 6 is integrated therewith for scanning 1-D and 2-D bar code symbols.

In FIG. 10, the laser scanning module of FIG. 5 is shown embodied within a hand-held bar code symbol driven Internet-based access terminal 75. As shown, the terminal 75 is shown connected to an ISP 76 by way of a radio-base station 77 and wireless link 78 The hand-held Internet Access Terminal 75 has an integrated GUI-based web browser program, display panel 79, touch-screen type keypad 80, and programmed bar code symbol scanner 81 incorporating the laser scanning module of FIG. 5. The function of bar code symbol scanner 81 can be multi-fold: namely: it may be used to read a bar code symbol 82 that is encoded with the URL of a transaction-enabling Web page to be accessed from a web (http) server 83 by the Internet-based Transaction-Enabling System, and produce symbol character data representative thereof; it may be used to read UPC-type bar code symbols in order to access a database connected to the Internet 85 by way of a common gateway interface (CGI); or it may be simply used to read other types of bar code symbols that identify a product or article in a conventional manner.

In the illustrative embodiment, the Internet Access Terminal 75 is realized as a transportable computer, such as the Newton® Model 2000 Messagepad from Apple Computer, Inc. of Cupertino, Calif. This device is provided with NetHopper™ brand Internet Access Software from which supports the TCP/IP networking protocol within the Newton MessagePad operating system. The Newton Messagepad is also equipped with a Motorola PCMCIA-based modem card 86 having a RF transceiver for establishing a wireless digital communication link with either (i) a cellular base station, or (ii) one or more satellite-base stations connected to the Internet by way of ISP 76 in a manner well known in the global information networking art.

As shown, the entire Newton MessagePad, ScanQuest® laser scanning module 75 and auxiliary battery supply (not shown) are completely housed within a rubberized shock-proof housing 87, in order to provide a hand-supportable unitary device. Once the object (e.g., transaction card) 88 is detected by the object detection field 89, a laser beam 90 is automatically projected and swept across the bar code symbol thereon.

Figure 11:
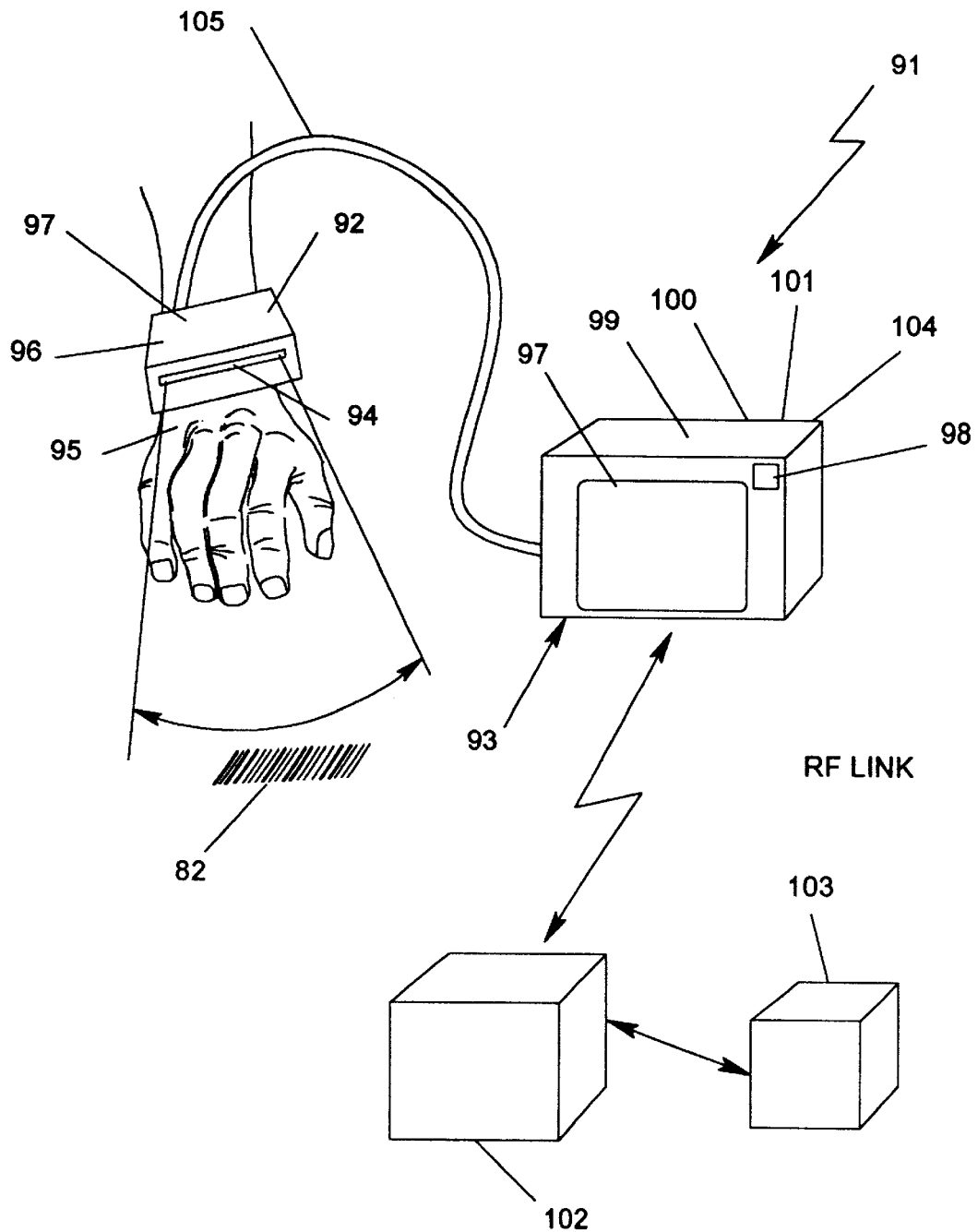
FIG. 11 is a perspective view of a body-wearable Internet-based data transaction terminal according to the present invention, in which the laser beam scanning module of FIGS. 5 and 6 is integrated therewith for scanning 1-D and 2-D bar code symbols.

In the above-illustrative embodiments, the bar code symbol reading device has been either supported within the hand of the operator, upon a countertop surface or the like. It is contemplated, however, that the laser scanning module of the present invention can be embodied within a body-wearable bar code symbol reader designed to be worn on the body of an operator as illustrated in FIG. 11. As shown, the body-wearable Internet-based system 91 comprises: a bar code symbol scanning unit 92 designed to be worn on the back of the hand, and within which the 1D/2D laser scanning module of the present invention is integrated; and a remote unit 93 (i.e., body-wearable RF-based Internet access terminal) designed to be worn about the forearm or foreleg of the operator by fastening thereto using flexible straps or like fastening technology.

In the illustrative embodiment, hand-mounted scanning unit 92 comprises: a light transmission window 94 for exit and entry of light used to scan bar code symbols; a glove 95 worn by the operator for releasably mounting the housing 96 to the back of his or her hand; and a laser scanning bar code symbol reader 97, as described hereinabove with respect to the other illustrative embodiments of the present invention.

In the illustrative embodiment, the remote unit 93 comprises: an LCD touch-screen type panel 97; an audio-speaker 98; a RISC-based microcomputing system or platform 99 for supporting various computing functions including, for example, TCP/IP, HTTP, and other Internet protocols (e.g., E-mail, FTP, etc.) associated with the use of an Internet browser or communicator program (e.g., Netscape Navigator or Communicator, or MicroSoft Explorer programs) provided by the remote unit; a telecommunication modem 100 interfaced with the microcomputing system; an RF transceiver 101 (e.g., employing DFSK or spread-spectrum modulation techniques) also interfaced with the telecommunication modem for supporting a 2-way telecommunication protocol (e.g., PPP) known in the art, between the microcomputing system and a remote transceiver 102 (described hereinabove) which is interfaced with ISP 103 connected to the Internet; a (rechargeable) battery power supply 104 aboard the remote housing, for providing electrical power to the components therein as well as to the bar code symbol reader 97; and a flexible cable 105, for supporting communication between the bar code symbol reader and the microcomputing platform, and electrical power transfer from the power supply to the bar code symbol reader. Notably, the remote unit 93 will embody one of the Internet access methods described hereinabove. The method used by remote unit 93 (i.e., Internet access terminal) will depend on the information that is encoded within the bar code symbol scanned by the bar code symbol reader thereof. Preferably, the remote unit is worn on the forearm of the operator so that the touch-type LCD panel 97 integrated therewith can be easily viewed during use of the body-wearable system of the present invention. Thus, for example, when an URL-encoded bar code symbol is read by the hand-mounted (or finger-mounted) bar code symbol reader 92, the transaction-enabling Web page associated with the scanned bar code symbol displayed on the LCD panel can be easily viewed and interacted with by the operator. Also, in response to reading an URL-encoded bar code symbol (i.e., transaction enabled thereby), the operator may be required to manually enter information to the Web page being displayed, using the touch-screen display panel 97 and pen-computing software, well known in the art.

Having described the illustrative embodiments of the present invention, several modifications readily come to mind.

For example, while the illustrative embodiments have disclosed the use of base sheet material comprising copper laminated onto Kapton™ plastic material during the fabrication of the scanning element hereof, it is understood that other types of resilient plastic materials, including Mylar™ plastic material, can be used to manufacture the scanning element with suitable results.

Also, in some applications, it might be desirable to configure several 1D/2D laser beam scanning modules hereof in relation with each other in order to generate various types of omnidirectional scanning patterns.

Also, the VLD and its associated beam shaping optics may be integrated within any of the module housings disclosed herein in order to produce an miniature laser scanner capable of producing 1D and 2D scanning patterns under electronic control. Such laser scanners can be integrated within various types of systems using bar code symbols to drive or direct host system operation.

It is understood that the laser scanning modules of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A bar code symbol reading system for producing a scanning pattern for scanning a bar code symbol on an object, said bar code symbol reading system comprising:

an optical bench;

a scanning element of unitary construction having a base portion, a light beam deflecting portion, and a flexible photo-etched gap region disposed therebetween, said base portion being anchored with respect to said optical bench so as to permit said light beam deflecting portion to pivot about a fixed pivot point defined between said base portion and said flexible photo-etched gap region, said light beam deflecting portion having a front surface and a rear surface and being flexibly connected to said base portion by said photo-etched gap region, said light beam deflecting portion having a natural resonant frequency of oscillation about said fixed pivot point tuned by the physical dimensions of said flexible photo-etched gap region;

a permanent magnet mounted on said light beam deflecting portion;

a light beam source for producing a light beam;

a light beam deflecting element mounted on said light beam deflecting portion, for deflecting said light beam falling incident upon said light beam deflecting element;

a magnetic-field producing coil having a pair of input terminals, and disposed adjacent said permanent magnet, for producing a magnetic force field of reversible polarity in the vicinity of said permanent magnet in response to an electrical current signal flowing through said magnetic-field producing coil, at an amplitude which varies at a controlled frequency;

an electrical circuit operably connected to said pair of input terminals, and producing an electrical voltage signal which causes said electrical current signal to flow through said magnetic-field producing coil and produce in the vicinity of said permanent magnet, said magnetic force field having a polarity which varies in accordance with the amplitude and frequency of said electrical current flowing through said magnetic-field producing coil, said magnetic force field interacting with said permanent magnetic and forcing said light beam deflecting portion to oscillate about said fixed pivot point at a controlled frequency of oscillation that is substantially equal to said controlled frequency and substantially different in frequency from said natural resonant frequency of oscillation of said light beam deflecting portion, and when said light beam is incident upon said light beam deflecting element, said light beam being periodically deflected as said light beam deflecting portion oscillates about said fixed pivot point at said forced frequency of oscillation, thereby creating a one-dimensional scanning pattern for scanning bar code symbols;

a light collecting mechanism for collecting light from said one-dimensional scanning pattern reflected off said scanned bar code symbols; and a light detector for detecting said collected light and producing scan data indicative of the intensity of said detected light.

2. The bar code symbol reading system of claim 1, wherein said light beam source comprises a visible laser diode (VLD) for producing a visible laser beam.

3. The bar code symbol reading system of claim 2, wherein said controlled frequency of oscillation is different in magnitude than said natural resonant frequency of oscillation by at least 10% of said natural resonant frequency.

4. The bar code symbol reading system of claim 1, wherein said light beam deflecting portion, said flexible photo-etched gap portion and said base portion each comprise a layer of flexible material, and said light beam deflecting portion and said base portion each include a pair of metal elements mounted in registration on said layer of flexible material.

5. The bar code symbol reading system of claim 4, wherein said natural resonant frequency of oscillation of said light beam deflecting portion is related to the thickness of said layer of flexible material and the dimensions of said flexible photo-etched gap portion.

6. The bar code symbol reading system of claim 1, wherein said light beam deflecting element comprises a light reflective element mounted onto the front surface of said light beam deflecting portion.

7. The bar code symbol reading system of claim 1, wherein said light beam deflecting element comprises a light refractive element mounted onto the front surface of said light beam deflecting portion.

8. The bar code symbol reading system of claim 1, wherein said light beam deflecting element comprises a light diffractive element mounted onto the front surface of said light beam deflecting portion.

9. The bar code symbol reading system of claim 1, wherein said permanent magnet is mounted on said rear surface of said light beam deflecting portion, and said light beam deflecting element is mounted on said front surface of said light beam deflecting portion.

10. The bar code symbol reading system of claim 1, wherein said optical bench comprises a module having a first wall structure in which said magnetic-field producing coil is mounted, and a second wall structure to which said base portion is mounted.

11. The bar code symbol reading system of claim 10, wherein said module further comprises a pair of stops disposed on opposite sides of said flexible photo-etched gap portion, to restrict the angular rotation of said scanning element about said fixed pivot point.

12. The bar code symbol reading system of claim 10, wherein said module comprises a scanning aperture through which said light beam is permitted to be swept as said light beam deflecting portion oscillates about said fixed pivot point at said forced frequency of oscillation.

13. The bar code symbol reading system of claim 1, wherein said electrical circuit comprises means for setting said controlled frequency.

14. The bar code symbol reading system of claim 1, which further comprises a light source for producing said light beam directed incident on said light beam deflecting element.

15. The bar code symbol reading system of claim 14, wherein said light source comprises a visible laser diode.

16. The bar code symbol reading system comprising:

said apparatus of claim 1 which further comprises a scan data processor for decode processing said scan data in order to produce symbol character data representative of said scanned bar code symbol.

17. A bar code symbol reading system for producing a scanning pattern for scanning a bar code symbol on an object, said bar code symbol reading system comprising:

an optical bench;

a scanning element of unitary construction having a base portion, a light beam deflecting portion, and a flexible photo-etched gap region disposed therebetween, said base portion being anchored with respect to said optical bench so as to permit said light beam deflecting portion to pivot about a fixed pivot point defined between said base portion and said flexible photo-etched gap region, said light beam deflecting portion having a front surface and a rear surface and being flexibly connected to said base portion by said photo-etched gap region, said light beam deflecting portion having a natural resonant frequency of oscillation about said fixed pivot point tuned by the physical dimensions of said flexible photo-etched gap region;

a permanent magnet mounted on said light beam deflecting portion;

a light beam source for producing a light beam;

a light beam deflecting element mounted on said light beam deflecting portion, for deflecting said light beam falling incident upon said light beam deflecting element;

a magnetic-field producing coil having a pair of input terminals, and disposed adjacent said permanent magnet, for producing a magnetic force field of reversible polarity in the vicinity of said permanent magnet in response to an electrical current signal flowing through said magnetic-field producing coil, at an amplitude which varies at a controlled frequency;

an electrical circuit operably connected to said pair of input terminals, and producing an electrical voltage signal which causes said electrical current signal to flow through said magnetic-field producing coil and produce in the vicinity of said permanent magnet, said magnetic force field having a polarity which varies in accordance with the amplitude and frequency of said electrical current flowing through said magnetic-field producing coil, and said magnetic force field interacting with said permanent magnetic and forcing said light beam deflecting portion to oscillate about said fixed pivot point at a controlled frequency of oscillation that is substantially equal to said controlled frequency and substantially different in frequency from said natural resonant frequency of oscillation of said light beam deflecting portion, and when said light beam is incident upon said light beam deflecting element, said light beam being periodically deflected as said light beam deflecting portion oscillates about said fixed pivot point at said forced frequency of oscillation, thereby creating a one-dimensional scanning pattern for scanning bar code symbols.

18. The bar code symbol reading system of claim 17, which further comprises a light collecting mechanism for collecting light from said one-dimensional scanning pattern reflected off said scanned bar code symbols.

19. The bar code symbol reading system of claim 17, which further comprises a light detector for detecting said collected light and producing scan data indicative of the intensity of said detected light.

20. The bar code symbol reading system of claim 17, wherein said light beam source comprises a visible laser diode (VLD) for producing a visible laser beam.

21. The bar code symbol reading system of claim 20, wherein said controlled frequency of oscillation is different in magnitude than said natural resonant frequency of oscillation by at least 10% of said natural resonant frequency.

22. The bar code symbol reading system of claim 17, wherein said light beam deflecting portion, said flexible photo-etched gap portion and said base portion each comprise a layer of flexible material, and said light beam deflecting portion and said base portion each include a pair of metal elements mounted in registration on said layer of flexible material.

23. The bar code symbol reading system of claim 22, wherein said natural resonant frequency of oscillation of said light beam deflecting portion is related to the thickness of said layer of flexible material and the dimensions of said flexible photo-etched gap portion.

24. The bar code symbol reading system of claim 17, wherein said light beam deflecting element comprises a light reflective element mounted onto the front surface of said light beam deflecting portion.

25. The bar code symbol reading system of claim 17, wherein said light beam deflecting element comprises a light refractive element mounted onto the front surface of said light beam deflecting portion.

26. The bar code symbol reading system of claim 17, wherein said light beam deflecting element comprises a light diffractive element mounted onto the front surface of said light beam deflecting portion.

27. The bar code symbol reading system of claim 17, wherein said permanent magnet is mounted on said rear surface of said light beam deflecting portion, and said light beam deflecting element is mounted on said front surface of said light beam deflecting portion.

28. The bar code symbol reading system of claim 17, wherein said optical bench comprises a module having a first wall structure in which said magnetic-field producing coil is mounted, and a second wall structure to which said base portion is mounted.

29. The bar code symbol reading system of claim 17, wherein said module further comprises a pair of stops disposed on opposite sides of said flexible photo-etched gap portion, to restrict the angular rotation of said scanning element about said fixed pivot point.

30. The bar code symbol reading system of claim 17, wherein said module comprises a scanning aperture through which said light beam is permitted to be swept as said light beam deflecting portion oscillates about said fixed pivot point at said forced frequency of oscillation.

31. The bar code symbol reading system of claim 17, wherein said electrical circuit comprises means for setting said controlled frequency.

32. The bar code symbol reading system of claim 17, which further comprises a light source for producing said light beam directed incident on said light beam deflecting element.

33. The bar code symbol reading system of claim 31, wherein said light source comprises a visible laser diode.

34. The bar code symbol reading system comprising:
said apparatus of claim 17, which further comprises
a scan data processor for decode processing said scan data in order to produce symbol character data representative of said scanned bar code symbol.

* * * * *